US011235621B2

US 11,235,621 B2

(12) United States Patent
Asano

(10) Patent No.: US 11,235,621 B2
(45) Date of Patent: Feb. 1, 2022

(54) PNEUMATIC TIRE

(71) Applicant: The Yokohama Rubber Co., LTD., Tokyo (JP)

(72) Inventor: Tomohiro Asano, Hiratsuka (JP)

(73) Assignee: The Yokohama Rubber Co., LTD.

(*) Notice: Subject to any disclaimer, the term of this patent is extended or adjusted under 35 U.S.C. 154(b) by 572 days.

(21) Appl. No.: 16/091,092

(22) PCT Filed: Aug. 30, 2017

(86) PCT No.: PCT/JP2017/031226
§ 371 (c)(1),
(2) Date: Oct. 3, 2018

(87) PCT Pub. No.: WO2018/043589
PCT Pub. Date: Mar. 8, 2018

(65) Prior Publication Data
US 2019/0126686 A1    May 2, 2019

(30) Foreign Application Priority Data
Aug. 31, 2016  (JP) .............................. JP2016-170252

(51) Int. Cl.
*B60C 11/11*    (2006.01)
*B60C 11/12*    (2006.01)
(Continued)

(52) U.S. Cl.
CPC .......... *B60C 11/0302* (2013.01); *B60C 11/03* (2013.01); *B60C 11/0306* (2013.01);
(Continued)

(58) Field of Classification Search
CPC ............ B60C 11/0302; B60C 11/1204; B60C 11/1236; B60C 11/1369;
(Continued)

(56) References Cited

U.S. PATENT DOCUMENTS 5,316,062 A  *  5/1994  Lurois ................. B60C 11/0309
152/209.22
D556,671 S  *  12/2007  Nonaka ........................ D12/567
(Continued)

FOREIGN PATENT DOCUMENTS

JP      08-300908 A  *  11/1996
JP      10-081114 A  *   3/1998
(Continued)

OTHER PUBLICATIONS

Machine translation for Japan 2006-111091 (Year: 2020).*
(Continued)

*Primary Examiner* — Steven D Maki
(74) *Attorney, Agent, or Firm* — Thorpe North & Western

(57) ABSTRACT

A tread surface of a pneumatic tire is configured so that, given an inner region inward from shoulder circumferential main grooves in a tire lateral direction, and outer regions outward from the shoulder circumferential main grooves in the tire lateral direction, blocks positioned in the inner region are defined into three or more small blocks by narrow grooves, and blocks positioned in the outer regions are defined into a number of small blocks by the narrow grooves, the number being at least one less than the number of small blocks defined in the blocks positioned in the inner region. The small blocks including frontmost portions of the blocks in a tire rotation direction are leading-side blocks, and the small blocks including backmost portions of the blocks in the tire rotation direction are trailing-side blocks. The leading-side blocks have a surface area that is less than that of the trailing-side blocks.

20 Claims, 15 Drawing Sheets

(51) Int. Cl.
　　　*B60C 11/03*　　　(2006.01)
　　　*B60C 11/13*　　　(2006.01)
(52) U.S. Cl.
　　　CPC ...... *B60C 11/1204* (2013.01); *B60C 11/1236* (2013.01); *B60C 11/1259* (2013.01); *B60C 11/13* (2013.01); *B60C 11/1369* (2013.01); *B60C 2011/0346* (2013.01); *B60C 2011/0369* (2013.01); *B60C 2011/1213* (2013.01); *B60C 2011/1245* (2013.01); *B60C 2011/1295* (2013.01); *B60C 2200/06* (2013.01)
(58) Field of Classification Search
　　　CPC ..... B60C 2011/0346; B60C 2011/0369; B60C 2011/1213; B60C 2011/1245; B60C 2011/1295
　　　See application file for complete search history.

(56) References Cited

U.S. PATENT DOCUMENTS

| | | | |
|---|---|---|---|
| D560,158 S * | 1/2008 | Durand | D12/600 |
| 2010/0078107 A1* | 4/2010 | Bonhomme | B60C 11/12 152/209.25 |
| 2010/0252158 A1 | 10/2010 | Haga | |
| 2011/0220261 A1 | 9/2011 | Matsuzawa | |
| 2016/0114629 A1* | 4/2016 | Hashimoto | B60C 11/12 152/209.25 |
| 2019/0092102 A1* | 3/2019 | Iga | B60C 11/1369 |
| 2019/0118581 A1* | 4/2019 | Suzuki | B60C 11/1236 |

FOREIGN PATENT DOCUMENTS

| | | |
|---|---|---|
| JP | 2003-080907 | 3/2003 |
| JP | 2006-111091 A * | 4/2006 |
| JP | 2009-107471 | 5/2009 |
| JP | 4715890 | 7/2011 |
| JP | 2012-035699 | 2/2012 |
| JP | 2012-131265 | 7/2012 |
| JP | 5425802 | 2/2014 |
| JP | 2014-080112 | 5/2014 |
| JP | 2016-000575 | 1/2016 |
| WO | WO 2009/057663 | 5/2009 |
| WO | WO 2010/055659 | 5/2010 |
| WO | WO 2015/190524 | 12/2015 |

OTHER PUBLICATIONS

Machine translation for Japan 10-081114 (Year: 2020).*
Machine translation for Japan 08-300908 (Year: 2020).*
International Search Report for International Application No. PCT/JP2017/031226 dated Nov. 28, 2017, 4 pages, Japan.

* cited by examiner

|  | CONVENTIONAL EXAMPLE | COMPARATIVE EXAMPLE 1 | COMPARATIVE EXAMPLE 2 | EXAMPLE 1 | EXAMPLE 2 | EXAMPLE 3 |
|---|---|---|---|---|---|---|
| CIRCUMFERENTIAL MAIN GROOVE HAS ZIGZAG SHAPE | NO | YES | YES | YES | YES | YES |
| INNER REGION HAS THREE OR MORE SMALL BLOCKS OUTER REGION HAS FEWER SMALL BLOCKS | NO | NO | YES | YES | YES | YES |
| SMALL BLOCK SURFACE AREA RATIO: LEADING SIDE < TRAILING SIDE | NO | NO | NO | YES | YES | YES |
| LEADING-SIDE BLOCK IS ON TIRE EQUATOR LINE SIDE | NO | NO | NO | NO | YES | YES |
| SUM OF SURFACE AREAS OF SMALL BLOCKS AT INTERSECTION PORTION INCREASES FROM INNER SIDE TOWARD OUTER SIDE | NO | NO | NO | NO | NO | YES |
| RATIO OF OUTER INTERSECTION PORTION SURFACE AREA TO INNER INTERSECTION PORTION SURFACE AREA | 0.5 | 0.5 | 0.5 | 0.5 | 0.5 | 0.5 |
| AMOUNT OF SHIFT BETWEEN ADJACENT BLOCKS DIFFERS BETWEEN CENTER PORTION AND OTHER AREAS | NO | NO | NO | NO | NO | NO |
| GROOVE WIDTH OF CIRCUMFERENTIAL MAIN GROOVE / GROOVE WIDTH OF LUG GROOVE | 0.3 | 0.3 | 0.3 | 0.3 | 0.3 | 0.3 |
| TWO-STEP RAISED BOTTOM PORTION IN SHOULDER LUG GROOVE | NO | NO | NO | NO | NO | NO |
| CENTER REGION: ASYMMETRICAL | NO | NO | NO | NO | NO | NO |
| UNEVEN WEAR PERFORMANCE | 100 | 100 | 101 | 103 | 103 | 105 |
| PASS-BY NOISE PERFORMANCE | 100 | 102 | 102 | 103 | 104 | 104 |

FIG. 18A

|  | EXAMPLE 4 | EXAMPLE 5 | EXAMPLE 6 | EXAMPLE 7 | EXAMPLE 8 | EXAMPLE 9 |
|---|---|---|---|---|---|---|
| CIRCUMFERENTIAL MAIN GROOVE HAS ZIGZAG SHAPE | YES | YES | YES | YES | YES | YES |
| INNER REGION HAS THREE OR MORE SMALL BLOCKS OUTER REGION HAS FEWER SMALL BLOCKS | YES | YES | YES | YES | YES | YES |
| SMALL BLOCK SURFACE AREA RATIO: LEADING SIDE < TRAILING SIDE | YES | YES | YES | YES | YES | YES |
| LEADING-SIDE BLOCK IS ON TIRE EQUATOR LINE SIDE | YES | YES | YES | YES | YES | YES |
| SUM OF SURFACE AREAS OF SMALL BLOCKS AT INTERSECTION PORTION INCREASES FROM INNER SIDE TOWARD OUTER SIDE | YES | YES | YES | YES | YES | YES |
| RATIO OF OUTER INTERSECTION PORTION SURFACE AREA TO INNER INTERSECTION PORTION SURFACE AREA | 1.6 | 0.8 | 1 | 1.2 | 1 | 1 |
| AMOUNT OF SHIFT BETWEEN ADJACENT BLOCKS DIFFERS BETWEEN CENTER PORTION AND OTHER AREAS | NO | NO | NO | NO | YES | YES |
| GROOVE WIDTH OF CIRCUMFERENTIAL MAIN GROOVE / GROOVE WIDTH OF LUG GROOVE | 0.3 | 0.3 | 0.3 | 0.3 | 0.3 | 1.2 |
| TWO-STEP RAISED BOTTOM PORTION IN SHOULDER LUG GROOVE | NO | NO | NO | NO | NO | NO |
| CENTER REGION: ASYMMETRICAL | NO | NO | NO | NO | NO | NO |
| UNEVEN WEAR PERFORMANCE | 106 | 106 | 107 | 106 | 107 | 107 |
| PASS-BY NOISE PERFORMANCE | 104 | 104 | 105 | 104 | 106 | 107 |

FIG. 18B

|  | EXAMPLE 10 | EXAMPLE 11 | EXAMPLE 12 | EXAMPLE 13 | EXAMPLE 14 |
|---|---|---|---|---|---|
| CIRCUMFERENTIAL MAIN GROOVE HAS ZIGZAG SHAPE | YES | YES | YES | YES | YES |
| INNER REGION HAS THREE OR MORE SMALL BLOCKS OUTER REGION HAS FEWER SMALL BLOCKS | YES | YES | YES | YES | YES |
| SMALL BLOCK SURFACE AREA RATIO: LEADING SIDE < TRAILING SIDE | YES | YES | YES | YES | YES |
| LEADING-SIDE BLOCK IS ON TIRE EQUATOR LINE SIDE | YES | YES | YES | YES | YES |
| SUM OF SURFACE AREAS OF SMALL BLOCKS AT INTERSECTION PORTION INCREASES FROM INNER SIDE TOWARD OUTER SIDE | YES | YES | YES | YES | YES |
| RATIO OF OUTER INTERSECTION PORTION SURFACE AREA TO INNER INTERSECTION PORTION SURFACE AREA | 1 | 1 | 1 | 1 | 1 |
| AMOUNT OF SHIFT BETWEEN ADJACENT BLOCKS DIFFERS BETWEEN CENTER PORTION AND OTHER AREAS | YES | YES | YES | YES | YES |
| GROOVE WIDTH OF CIRCUMFERENTIAL MAIN GROOVE / GROOVE WIDTH OF LUG GROOVE | 0.5 | 0.8 | 1 | 0.8 | 0.8 |
| TWO-STEP RAISED BOTTOM PORTION IN SHOULDER LUG GROOVE | NO | NO | NO | YES | YES |
| CENTER REGION: ASYMMETRICAL | NO | NO | NO | NO | YES |
| UNEVEN WEAR PERFORMANCE | 107 | 108 | 107 | 109 | 109 |
| PASS-BY NOISE PERFORMANCE | 106 | 108 | 106 | 109 | 110 |

FIG. 18C

PNEUMATIC TIRE

TECHNICAL FIELD

The present technology relates to a pneumatic tire.

BACKGROUND ART

In a pneumatic tire, in order to discharge water between a tread surface and a road surface during travel on wet road surfaces, a plurality of grooves are formed in the tread surface. These grooves in the tread surface, however, cause noise and uneven wear when the vehicle is driven. Thus, among the pneumatic tires in the related art, there are tires that achieve reduced noise and uneven wear as a result of considerations made to a shape and an arrangement of the grooves.

For example, in the pneumatic tire described in Japan Patent No. 5425802, blocks of a so-called block pattern are each made into a polygon having six sides or more, and each other leading-side edges of the blocks of respective rows during the rolling of the tire under a load are provided with interval in a tread circumferential direction, thereby preventing the occurrence of large collision noise caused by a plurality of the blocks of the respective block rows simultaneously colliding with the road surface. Further, in the pneumatic tire described in Japan Patent No. 4715890, an open sipe that divides the block in a tire circumferential direction is formed in the blocks of the block pattern, and the open sipe is bent so as to include a lateral sipe portion where the open sipe extends in a tire lateral direction, and a circumferential sipe portion where the open sipe extends in the tire circumferential direction, the circumferential sipe portion being disposed in the middle of the lateral sipe portion, thereby suppressing abnormal wear and improving performance on snow and ice.

Here, in the block pattern, a trailing side of each block readily wears, causing a difference in a degree of wear between a leading side and a trailing side, increasing uneven wear susceptibility. While noise can be suppressed by shifting leading-side edges of blocks in the tread circumferential direction between different block rows as in Japan Patent No. 5425802, difficulties arise in suppressing the uneven wear caused by such a difference in the degree of wear between the leading side and the trailing side of each block. Further, while collision noise caused by the plurality of leading-side edges of the blocks simultaneously colliding with the road surface can be reduced by shifting the leading-side edges of the blocks in the tread circumferential direction between different block rows as in Japan Patent No. 5425802, such a shift does not lead to a reduction in noise from the perspective of an individual block.

Further, while uneven wear caused by a difference in the degree of wear between the leading side and the trailing side can be suppressed to a certain degree by bending open sipes provided in the blocks as in Japan Patent No. 4715890, the collision noise when the block collides with the road surface does not change, making the reduction of noise produced by each block difficult. In this way, satisfaction of both uneven wear resistance and noise reduction has been extremely difficult.

SUMMARY

The present technology provides a pneumatic tire capable of improving uneven wear resistance and reducing noise in a compatible manner.

A pneumatic tire according to the present technology is a pneumatic tire having a specified rotation direction, including a plurality of circumferential main grooves formed on a tread surface and extending in a tire circumferential direction, a plurality of lug grooves formed on the tread surface and extending in a tire lateral direction, a plurality of blocks wherein both sides of the each block being defined in the tire circumferential direction by the lug grooves and at least one end portion of the each block being defined in the tire lateral direction by the circumferential main grooves, and a plurality of block rows formed by aligning a plurality of the blocks in the tire circumferential direction. Given, a region in the tread surface inward from shoulder circumferential main grooves that are the circumferential main grooves positioned outermost in the tire lateral direction among the plurality of circumferential main grooves, as an inner region, and another each region in the tread surface outward from the shoulder circumferential main grooves in the tire lateral direction as outer regions, the inner region includes a plurality of the block rows aligned in the tire lateral direction. The blocks each includes narrow grooves that open to at least one of the circumferential main groove and the lug groove, and define the block into a plurality of small blocks. The blocks positioned in the inner region are defined into three or more of the small blocks by the narrow grooves. The blocks positioned in the outer regions are defined into a number of small blocks by the narrow grooves, the number being at least one less than the number of the small blocks defined in the block positioned in the inner region. The small block that, among the plurality of small blocks belonging to a block of the blocks, includes a portion of the block positioned on a frontmost side in a tire rotation direction is a leading-side block, the small block that, among the plurality of small blocks belonging to a block of the blocks, includes a portion of the block positioned on a backmost side in the tire rotation direction is a trailing-side block, and the leading-side block has a surface area less than that of the trailing-side block.

Further, in the pneumatic tire described above, preferably the blocks each has a length LB in the tire circumferential direction and a width WB in the tire lateral direction, the length LB and the width WB having a relationship within a range of $0.9 \leq (LB/WB) \leq 1.6$.

Further, in the pneumatic tire described above, preferably the leading-side block is adjacent to the circumferential main groove that, among the circumferential main grooves that define the block including the leading-side block, is positioned on a tire equator line side of the block.

Further, in the pneumatic tire described above, preferably a plurality of the lug grooves are configured so that the lug grooves connected from both sides in the tire lateral direction to the circumferential main grooves differ in position in the tire circumferential direction. Further, given, among intersection portions between the circumferential main grooves and the lug grooves, the intersection portion where the lug groove is connected to the circumferential main groove from an outer side in the tire lateral direction as an outer intersection portion, and among intersection portions, the intersection portion where the lug groove is connected to the circumferential main groove from an inner side in the tire lateral direction as an inner intersection portion, a total surface area of the plurality of small blocks adjacent to one of the outer intersection portions as an outer intersection portion surface area, and a total surface area of the plurality of small blocks adjacent to one of the inner intersection portions as an inner intersection portion surface area, a plurality of the outer intersection portion surface areas corresponding to a plurality of the outer intersection portions positioned in one region in the tire lateral direction from the tire equator line increase as a position of the outer intersection portion in the tire lateral direction increases in distance from the tire equator line to an outer side in the tire lateral direction, and a plurality of the inner intersection portion surface areas corresponding to a plurality of the inner intersection portions positioned in one region in the tire lateral direction from the tire equator line increase as a position of the inner intersection portion in the tire lateral direction increases in distance from the tire equator line to an outer side in the tire lateral direction.

Further, in the pneumatic tire described above, preferably the intersection portions between the lug grooves and the circumferential main groove positioned on the tire equator line are configured so that the intersection portions where the lug grooves are connected to the circumferential main groove from one region side with the tire equator line as a boundary are the inner intersection portions positioned in the other region side with the tire equator line as the boundary.

Further, in the pneumatic tire described above, preferably the blocks adjacent to each other with the circumferential main groove therebetween are configured so that the blocks adjacent to each other with a center circumferential main groove therebetween, the center circumferential main groove being the circumferential main groove among the plurality of circumferential main grooves that is positioned on the tire equator line, and the blocks adjacent to each other with one of the circumferential main grooves other than the center circumferential main groove therebetween differ in an amount of shift in the tire circumferential direction.

Further, in the pneumatic tire described above, preferably the blocks adjacent to each other with the center circumferential main groove therebetween have an amount of shift in the tire circumferential direction within a range of from 0.05 to 0.2 times, inclusive, the length LB of the block in the tire circumferential direction, and the blocks adjacent to each other with one of the circumferential main grooves other than the center circumferential main groove therebetween have an amount of shift in the tire circumferential direction within a range of from 0.4 to 0.6 times, inclusive, the length LB of the block in the tire circumferential direction.

Further, in the pneumatic tire described above, preferably the circumferential main grooves and the lug grooves that define a block of the blocks are configured so that the relationship between a groove width WS of the circumferential main groove and a groove width WL of the lug groove is within a range of $0.5 \leq (WS/WL) \leq 1.0$.

Further, in the pneumatic tire described above, preferably the lug groove defined as a shoulder lug groove connected from an outer side in the tire lateral direction to the shoulder circumferential main groove includes a raised bottom portion having a groove depth that gradually decreases from an inner side toward an outer side in the tire lateral direction.

Further, in the pneumatic tire described above, preferably the blocks have an asymmetrical shape with the tire equator line as an axis of symmetry in only portions positioned within a range of 15% of a developed tread width from the tire equator line to each side in the tire lateral direction.

A pneumatic tire according to the present technology achieves the effect of improving uneven wear resistance and reducing noise in a compatible manner.

BRIEF DESCRIPTION OF DRAWINGS

FIG. 18A is a table listing the results of performance tests of pneumatic tires.

FIG. 18B is a table listing the results of performance tests of pneumatic tires.

FIG. 18C is a table listing the results of performance tests of pneumatic tires.

DETAILED DESCRIPTION

Pneumatic tires according to embodiments of the present technology are described in detail below with reference to the drawings. However, the technology is not limited to these embodiments. Constituents of the following embodiments include elements that are essentially identical or that can be substituted or easily conceived by one skilled in the art.

Herein, "tire lateral direction" refers to the direction that is parallel with a rotation axis of a pneumatic tire. "Inward in the tire lateral direction" refers to the direction toward the tire equatorial plane in the tire lateral direction. "Outward in the tire lateral direction" refers to the direction opposite the direction toward the tire equatorial plane in the tire lateral direction. Further, "tire radial direction" refers to the direction orthogonal to the tire rotation axis. "Tire circumferential direction" refers to the direction of rotation with the tire rotation axis as the center of rotation.

Figure 1:
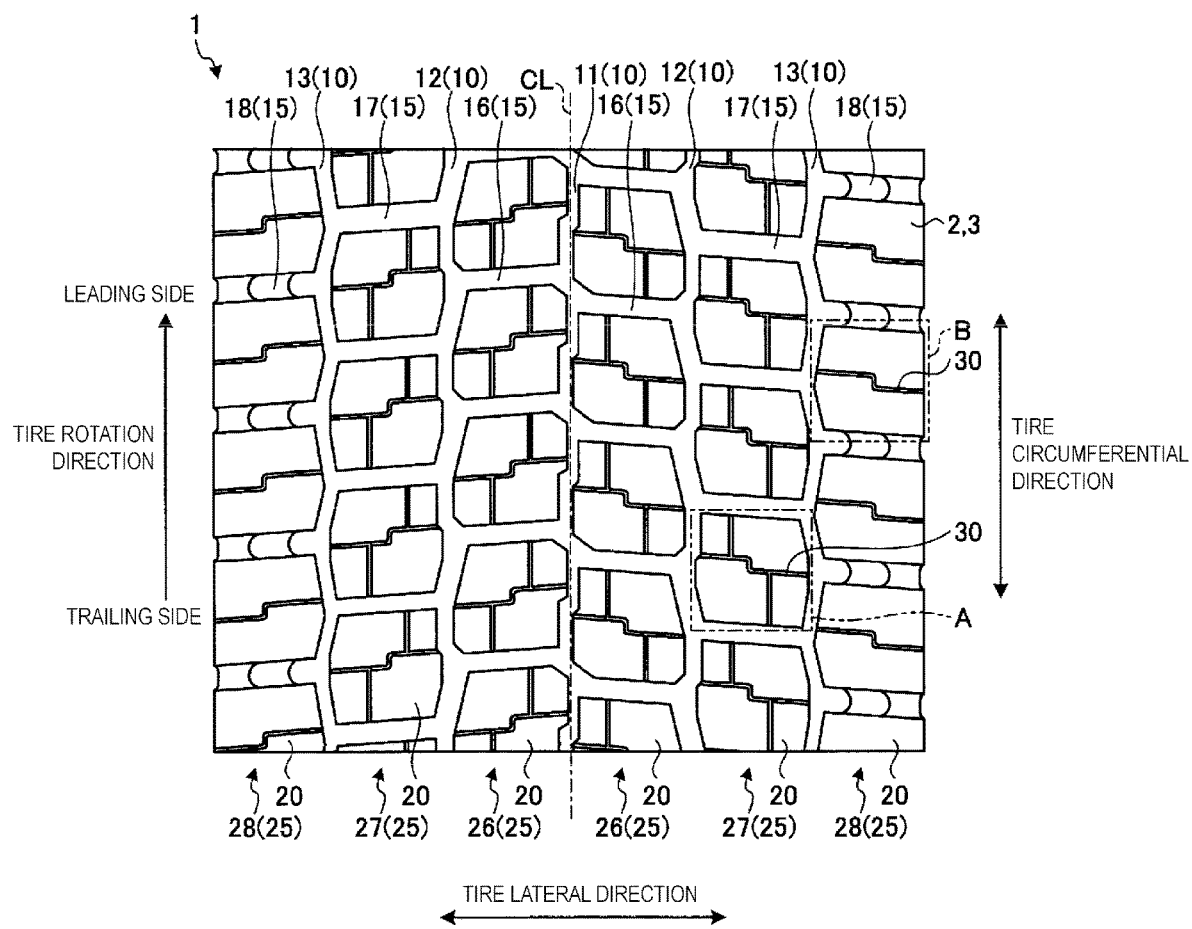
FIG. 1 is a plan view illustrating a tread surface of a pneumatic tire according to an embodiment.

FIG. 1 is a plan view of a tread surface of a pneumatic tire according to an embodiment of the present technology. A pneumatic tire 1 illustrated in FIG. 1 is provided with a tread portion 2 in an outermost portion in the tire radial direction. The surface of the tread portion 2, i.e., the portion that contacts the road surface when a vehicle (not illustrated) mounted with the pneumatic tire 1 travels, is formed as a tread surface 3. A plurality of circumferential main grooves 10 extending in the tire circumferential direction and a plurality of lug grooves 15 extending in the tire lateral direction are each formed in the tread portion 3, and a plurality of blocks 20 serving as land portions are formed by the circumferential main grooves 10 and the lug grooves 15. That is, the blocks 20 are defined by the lug grooves 15 on both sides in the tire circumferential direction, and by the circumferential main grooves 10 on at least one end portion in the tire lateral direction, and thus each of the blocks 20 has a substantially quadrangular shape.

Specifically, five circumferential main grooves 10 are formed aligned in the tire lateral direction, each of the five circumferential main grooves 10 are formed with repeated bending in the tire lateral direction while extending in the tire circumferential direction. That is, the circumferential main grooves 10 extending in the tire circumferential direction are formed in a zigzag shape that oscillates in the tire lateral direction while extending in the tire circumferential direction. Among the five circumferential main grooves 10, the circumferential main groove 10 positioned in a center in the tire lateral direction is a center circumferential main groove 11, the two circumferential main grooves 10 positioned on both sides of the circumferential main groove 11 in the tire lateral direction adjacent to the center circumferential main groove 11 are middle circumferential main grooves 12, and the two circumferential main grooves 10 positioned most outward in the tire lateral direction are shoulder circumferential main grooves 13. These circumferential main grooves 10 are configured so that the center circumferential main groove 11 is positioned on a tire equator line CL, and thus one each of the middle circumferential main grooves 12 and the shoulder circumferential main grooves 13 are disposed on each side of the tire equator line CL in the tire lateral direction.

Further, the lug grooves 15 are configured so that the lug grooves 15 that do not penetrate the circumferential main grooves 10 and are adjacent to each other via the circumferential main grooves 10 are formed in positions that differ in the tire circumferential direction. That is, the plurality of lug grooves 15 are configured so that the lug grooves 15 connected from both sides in the tire lateral direction to the circumferential main grooves 10 differ in position in the tire circumferential direction. Further, among the lug grooves 15 positioned between the circumferential main grooves 10, the lug grooves 15 positioned between the center circumferential main groove 11 and the middle circumferential main grooves 12 are center lug grooves 16, the lug grooves 15 positioned between the middle circumferential main grooves 12 and the shoulder circumferential main grooves 13 adjacent to each other are middle lug grooves 17, and the lug grooves 15 positioned on outer sides of each of the shoulder circumferential main grooves 13 in the tire lateral direction are shoulder lug grooves 18. That is, a plurality of the lug grooves 15 are disposed in different positions in the tire lateral direction.

The circumferential main grooves 10 here have a groove width within a range of from 3 to 10 mm, inclusive, and a groove depth within a range of from 7 to 25 mm, inclusive. Further, the lug grooves 15 here have a groove width within a range of from 4 to 12 mm, inclusive, and a groove depth within a range of from 5 to 25 mm, inclusive.

The blocks 20 defined by the circumferential main grooves 10 and the lug grooves 15 are disposed between circumferential main grooves 10 adjacent to each other as well as on the outer side in the tire lateral direction of each of the two circumferential main grooves 10 positioned most outward in the tire lateral direction. Further, a plurality of the blocks 20 positioned in substantially the same position in the tire lateral direction are aligned in series in the tire circumferential direction via the lug grooves 15, forming block rows 25 each in a row shape. Such a block row 25 is formed in four locations between five circumferential main grooves 10, and in two locations outward in the tire lateral direction of the two circumferential main grooves 10 positioned most outward in the tire lateral direction, forming six rows in total.

Among the six block rows 25, the block rows 25 positioned between the center circumferential main groove 11 and the middle circumferential main grooves 12 are center block rows 26, the block rows 25 positioned between the middle circumferential main grooves 12 and the shoulder circumferential main grooves 13 adjacent to each other are middle block rows 27, and the block rows 25 positioned on outer sides of each of the shoulder circumferential main grooves 13 in the tire lateral direction are shoulder block rows 28. That is, the center block rows 26 are the block rows 25 closest to the tire equator line CL, and the shoulder block rows 28 are the block rows 25 positioned most outward in the tire lateral direction. These six block rows 25 are aligned in the tire lateral direction on the tread surface 3. The tread pattern on the tread surface 3 of the pneumatic tire 1 according to the present embodiment is thus a so-called block pattern provided with land portions formed by the plurality of blocks 20.

Further, the pneumatic tire 1 according to the present embodiment has a specified rotation direction when mounted on a vehicle. In the description below, a leading side in the tire rotation direction is the rotation direction side when the pneumatic tire 1 rotates in the specified direction and, when the pneumatic tire 1 is mounted on a vehicle, rotated in the specified direction, and run, is the side that first contacts and first separates from the road surface. Further, a trailing side in the tire rotation direction is a side opposite to the rotation direction side when the pneumatic tire 1 rotates in the specified direction and, when the pneumatic tire 1 is mounted on a vehicle, rotated in the specified direction, and run, is the side that later contacts and separates from the road surface.

Each of the lug grooves 15 is inclined in a direction toward the trailing side in the tire rotation direction, as it goes from the tire equator line CL side to an outer side in the tire lateral direction. That is, the lug grooves 15 are each inclined in a direction toward the trailing side in the tire rotation direction, as it goes from an inner side to the outer side in the tire lateral direction while extending in the tire lateral direction. Note that the lug grooves 15 do not need to be inclined in the tire circumferential direction while extending in the tire lateral direction in all positions in which the lug grooves 15 define the blocks 20 in the tire circumferential direction. At least a portion of the lug grooves 15 that define the leading side of the blocks 20 in the tire rotation direction may be inclined in a direction toward the trailing side in the tire rotation direction, as it goes from the tire equator line CL side toward the outer side in the tire lateral direction.

Figure 2:
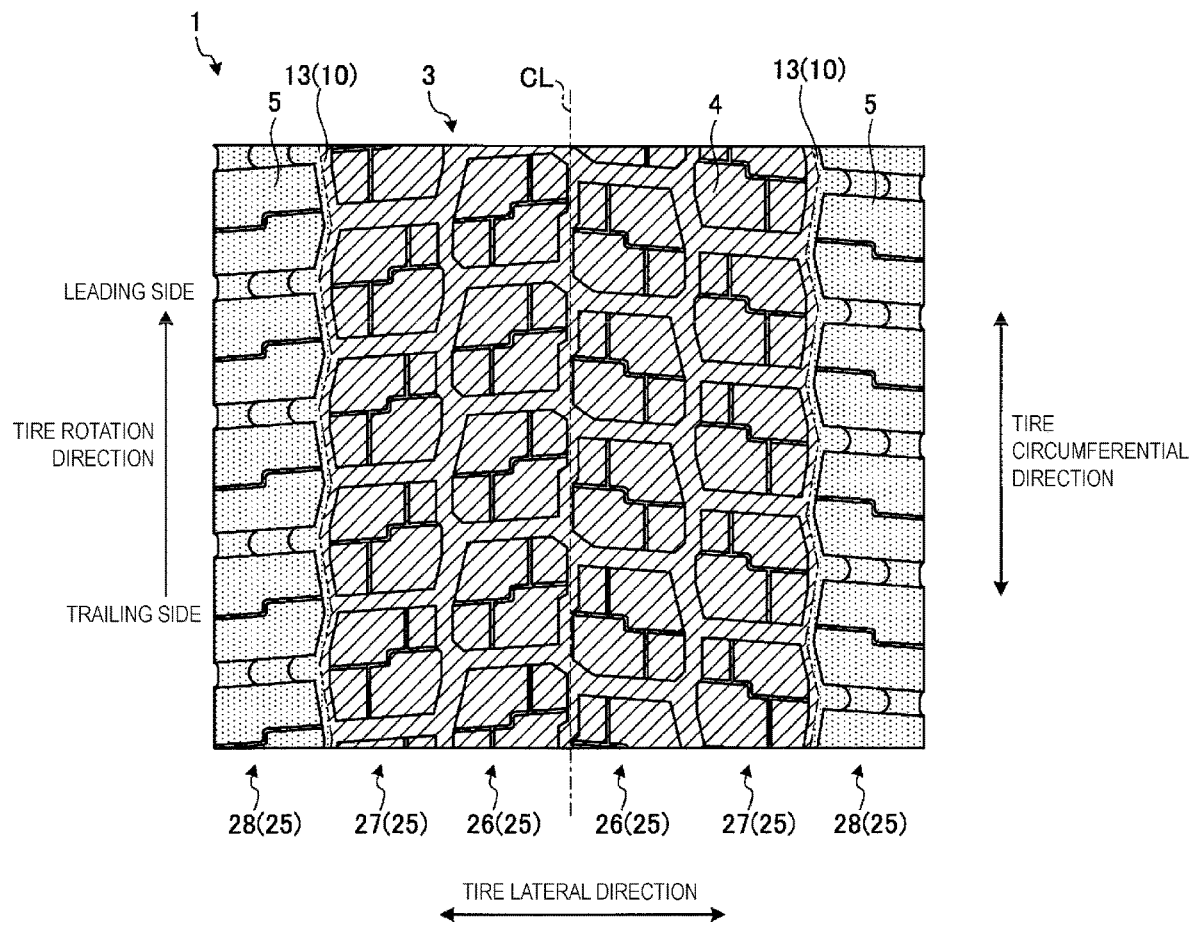
FIG. 2 is an explanatory diagram of a region of the tread surface illustrated in FIG. 1.

Further, narrow grooves 30 that open to at least one of the circumferential main grooves 10 and the lug grooves 15 defining the blocks 20 are formed in each of the blocks 20 of the six block rows 25 thus provided. These narrow grooves 30 differ in form according to the region defined on the tread surface 3. FIG. 2 is an explanatory diagram of a region of the tread surface illustrated in FIG. 1. On the tread surface 3, the region inward from the shoulder circumferential main grooves 13 in the tire lateral direction is defined as an inner region 4, and the regions outward from the shoulder circumferential main grooves 13 in the tire lateral direction are defined as the outer regions 5. In this case, the inner region 4 includes a plurality of the block rows 25 aligned in the tire lateral direction. That is, the inner region 4 includes four block rows 25, namely two center block row 26 and two middle block rows 27, positioned inward from the two shoulder circumferential main grooves 13 in the tire lateral direction. Further, the two outer regions 5 respectively positioned outward from the two shoulder circumferential main grooves 13 in the tire lateral direction each include one shoulder block row 28.

In the center block rows 26 and the middle block rows 27 positioned in the inner region 4, the narrow grooves 30 formed in the each block 20 open to the circumferential main grooves 10 and the lug grooves 15 that define the each block 20. Further, in the shoulder block rows 28 positioned in the outer regions 5, the narrow grooves 30 open to the shoulder circumferential main grooves 13 that define the each block 20 as well as to the outer sides of the blocks 20 in the tire lateral direction. Further, the narrow grooves 30 are each formed in substantially the same form in each of the blocks 20 positioned in the inner region 4, and are formed in substantially the same form in each of the blocks 20 positioned in the outer regions 5.

The narrow grooves 30 here each have a groove width within a range of from 0.8 to 2 mm, inclusive, and a groove depth within a range from 0.7 to 15 mm, inclusive, and include a sipe. Here, "sipe" refers to a groove formed into a narrow shape in the tread surface 3. When the pneumatic tire 1 is mounted on a regular rim, inflated to a regular internal pressure, and placed under no load conditions, wall surfaces constituting the sipe do not come into contact with each other. When the sipe is positioned in a portion of a ground contact surface formed on a flat plate with a load applied in a vertical direction on the plate, or when the block 20 where the sipe is formed collapses, the wall surfaces constituting the sipe, or at least portions of areas disposed on the wall surfaces, come into contact with each other as a result of deformation of the block 20. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to "maximum air pressure" defined by JATMA, a maximum value given in "Tire Load Limits At Various Cold Inflation Pressures" defined by TRA, or "Inflation Pressures" defined by ETRTO. The narrow grooves 30 in the present embodiment, even when positioned on the ground contact surface, maintain a state in which the groove walls are separated from each other, and include such a sipe.

Figure 3:
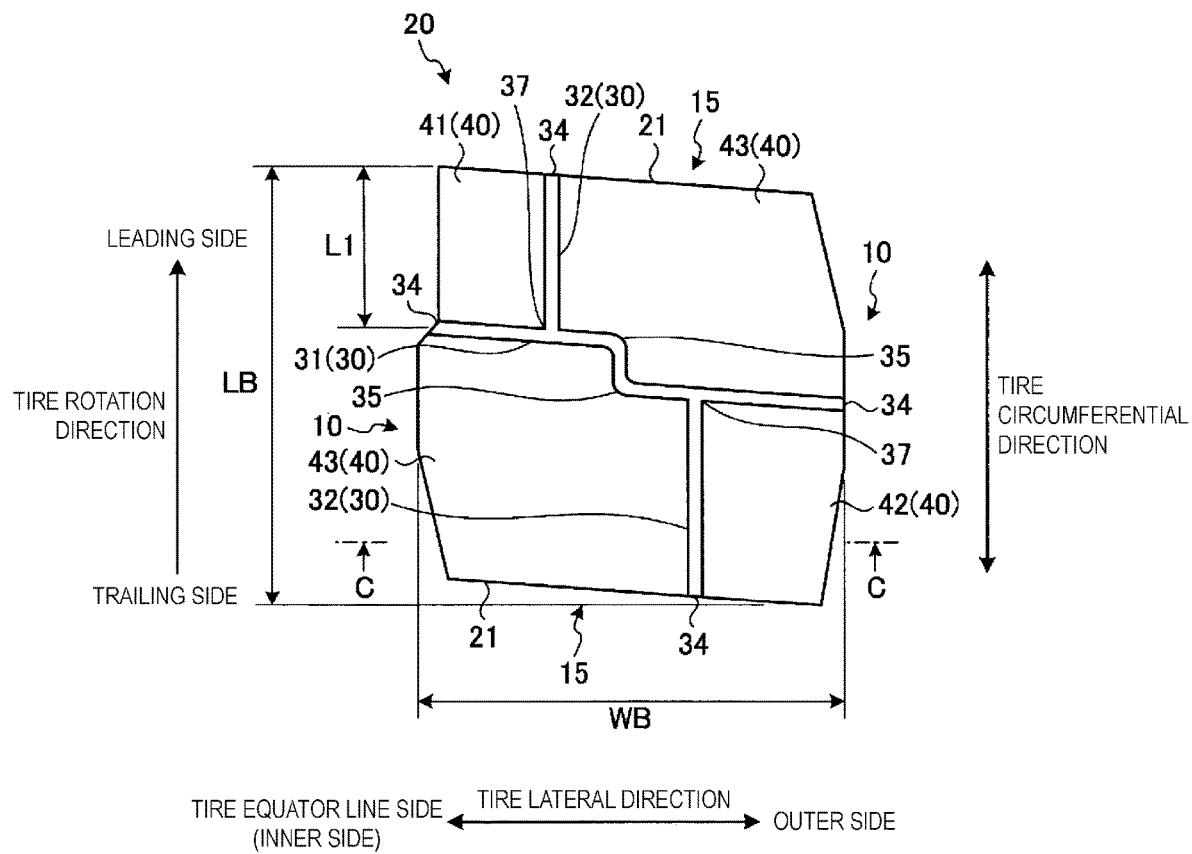
FIG. 3 is a detailed view of a part A of FIG. 1.

FIG. 3 is a detailed view of a part A of FIG. 1. The lug grooves 15 that define both sides of the block 20 in the tire circumferential direction incline in a direction toward the trailing side in the tire rotation direction, as it goes from the tire equator line CL side toward the outer side in the tire lateral direction, and thus an end portion on the tire equator line CL side in the tire lateral direction of the block 20 is positioned on a frontmost side in the tire rotation direction at an edge portion 21 on the leading side in the tire rotation direction. Further, at the edge portion 21 on the trailing side of the block 20 in the tire rotation direction, an end portion on the outer side in the tire lateral direction is positioned on the backmost side in the tire rotation direction.

Further, in the each block 20 constituting the four block rows 25 positioned in the inner region 4, the narrow grooves 30 include a lateral narrow groove 31 extending in the tire lateral direction, and circumferential narrow grooves 32 extending in the tire circumferential direction. The lateral narrow groove 31 of the narrow grooves 30 has at least one end that opens to the circumferential main grooves 10 defining the block 20. Further, the circumferential narrow grooves 32 have at least one end that opens to the lug grooves 15 defining the block 20.

Specifically, the lateral narrow groove 31 extending in the tire lateral direction is configured so that one end opens to the circumferential main groove 10 that defines the tire lateral direction CL side of the block 20 in the tire lateral direction, and another end opens to the circumferential main groove 10 that defines the outer side of the block 20 in the tire lateral direction. Both ends of the lateral narrow groove 31 thus form opening portions 34 that respectively open to the circumferential main grooves 10.

Further, the lateral narrow groove 31 bends at two locations while extending in the tire lateral direction, and includes two bent portions 35. The two bent portions 35 bend in directions such that the portion of the lateral narrow groove 31 positioned outward from the bent portion 35 in the tire lateral direction is positioned further to the trailing side in the tire rotation direction than the portion of the lateral narrow groove 31 positioned inward from the bent portion 35 in the tire lateral direction. These two bent portions 35 are positioned in a central region of the block 20 in the tire lateral direction at different positions in the tire circumferential direction, and the portion of the lateral narrow groove 31 between the bent portions 35 extends in the tire circumferential direction at a short length. In other words, the lateral narrow groove 31 bends at the two bent portions 35, forming a so-called crank-like shape.

Further, two of the circumferential narrow grooves 32 are provided, and these two circumferential narrow grooves 32 are positioned further outward of the block 20 in the tire lateral direction than the bent portions 35 of the lateral narrow groove 31. That is, one circumferential narrow groove 32, of the two circumferential narrow grooves 32, is positioned inward from the bent portions 35 in the tire lateral direction, and the other circumferential narrow groove 32 is positioned outward from the bent portions 35 in the tire lateral direction. The circumferential narrow groove 32, of the two circumferential narrow groove 32, positioned inward from the bent portions 35 in the tire lateral direction is positioned on the leading side of the lateral narrow groove 31 in the tire rotation direction, and the circumferential narrow groove 32 positioned outward from the bent portions 35 in the tire lateral direction is positioned on the trailing side of the lateral narrow groove 31 in the tire rotation direction.

The circumferential narrow grooves 32, at these positions, are each configured so that one end opens to the lug groove 15, and the other end intersects the lateral narrow groove 31, connecting and opening to the lateral narrow groove 31.

Specifically, the circumferential narrow groove 32 positioned inward from the bent portions 35 in the tire lateral direction is configured so that an end portion on the leading side in the tire rotation direction is an opening portion 34 that opens to the lug groove 15, and an end portion on the trailing side in the tire rotation direction is connected to the lateral narrow groove 31. Further, the circumferential narrow groove 32 positioned outward from the bent portions 35 in the tire lateral direction is configured so that an end portion on the trailing side in the tire rotation direction is an opening portion 34 that opens to the lug groove 15, and an end portion on the leading side in the tire rotation direction is connected to the lateral narrow groove 31.

A portion where the circumferential narrow groove 32 and the lateral narrow groove 31 intersect form an intersection point 37, and the narrow grooves 30 include two intersection points 37 formed by the two circumferential narrow grooves 32 intersecting one lateral narrow groove 31. That is, the narrow grooves 30 configured to include two intersection points 37 by two circumferential narrow grooves 32 being provided as one of the narrow grooves 30, and the two circumferential narrow grooves 32 intersecting the lateral narrow groove 31, which is another narrow groove 30. The bent portions 35 of the lateral narrow groove 31 are positioned between the two intersection points 37 in the tire lateral direction.

Figure 4:
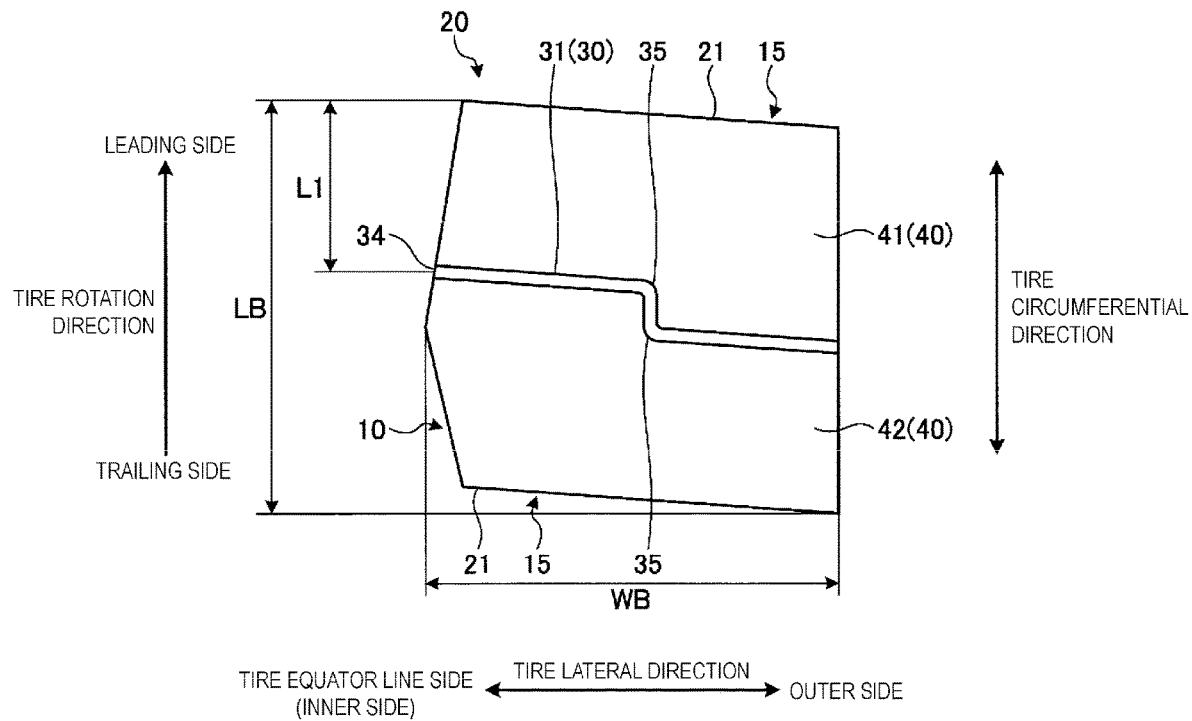
FIG. 4 is a detailed view of a part B of FIG. 1.

FIG. 4 is a detailed view of part B of FIG. 1. Further, in each of the blocks 20 constituting the block rows 25 positioned in the outer regions 5, the narrow grooves 30 do not include the circumferential narrow grooves 32 but rather only the lateral narrow groove 31 extending in the tire lateral direction. The lateral narrow groove 31 provided to each of the blocks 20 constituting the block rows 25 in the outer regions 5 is configured so that one end opens to the circumferential main groove 10 that defines the tire equator line CL side of the block 20 in the tire lateral direction, and the other end opens to an end portion of the block 20 in the tire lateral direction. Further, this lateral narrow groove 31 includes the two bent portions 35 in the same way as the lateral narrow groove 31 provided to the blocks 20 constituting the block row 25 in the inner region 4, and forms a crank-like shape in which a portion positioned outward from the bent portion 35 in the tire lateral direction is positioned further to the trailing side in the tire rotation direction than the portion positioned inward from the bent portion 35 in the tire lateral direction.

In the narrow grooves 30 thus formed in the blocks 20, a distance L1 in the tire circumferential direction from the portion of the block 20 positioned on the frontmost side in the tire rotation direction to the opening portion 34 that opens to the circumferential main groove 10 that defines the tire equator line CL side is within a range of from $0.2 \leq (L1/LB) \leq 0.5$ with respect to a length LB of the block 20 in the tire circumferential direction. That is, the opening portion 34 of the narrow groove 30 that opens to the circumferential main groove 10 that defines the tire equator line CL side opens to the circumferential main groove 10 at a position on the leading side from a center of the block 20 in the tire rotation direction. Note that the lug grooves 15 that define both sides of the block 20 in the tire circumferential direction incline in the tire circumferential direction with respect to the tire lateral direction, and thus the length LB of the block 20 in this case is a distance between portions on both sides of the block 20 in the tire circumferential direction that are farthest apart in the tire circumferential direction.

Further, the block 20 is configured so that, at the edge portion 21 on the leading side in the tire rotation direction, the end portion on the tire equator line CL side in the tire lateral direction is positioned on the frontmost side in the tire rotation direction, and thus the distance L1 is the distance in the tire circumferential direction between the end portion on the tire equator line CL side of the edge portion 21 on the leading side in the tire rotation direction, and the opening portion 34 that opens to the circumferential main groove 10 that defines the tire equator line CL side. The narrow groove 30 opens to the circumferential main groove 10 with the distance L1 from a leading end of the block 20 in the tire rotation direction to the opening portion 34 that opens to the circumferential main groove 10 that defines the tire equator line CL side being within a range of from 20 to 50%, inclusive, with respect to the length LB of the block 20 in the tire circumferential direction. Note that the position of the opening portion 34 in this case is a center position of an opening width of the opening portion 34 in the tire circumferential direction. Further, the relationship between the distance L1 in the tire circumferential direction to the opening portion 34 that opens to the circumferential main groove 10 on the tire equator line CL side and the length LB of the block 20 in the tire circumferential direction is preferably within a range of $0.3 \leq (L1/LB) \leq 0.4$.

Figure 5:
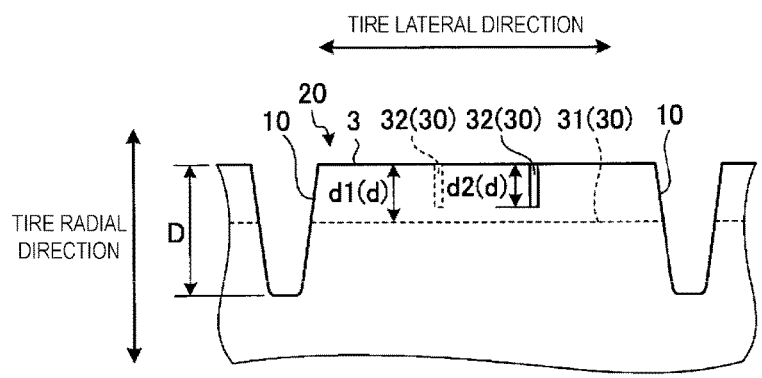
FIG. 5 is a cross-sectional view taken along C-C of FIG. 3.

FIG. 5 is a cross-sectional view taken along C-C of FIG. 3. The narrow grooves 30 have a groove depth d within a range of $0.05 \leq (d/D) \leq 0.3$ with respect to a groove depth D of the circumferential main groove 10. The groove depth d of the narrow grooves 30 is preferably within a range of $0.1 \leq (d/D) \leq 0.2$ with respect to the groove depth D of the circumferential main groove 10. Further, the narrow grooves 30 each have two or more groove depths and, in the present embodiment, the groove depths differ in the lateral narrow groove 31 and the circumferential narrow groove 32 of the narrow grooves 30. Specifically, a groove depth d1 of the lateral narrow groove 31 is greater than a groove depth d2 of the circumferential narrow groove 32, and the groove depth d2 of the circumferential narrow groove 32 is within a range of $0.5 \leq (d2/d1) \leq 0.9$ with respect to the groove depth d1 of the lateral narrow groove 31.

The narrow grooves 30 are formed in the block 20, and thus the block 20 is defined into a plurality of small blocks 40 by these narrow grooves 30. Further, the number of small blocks 40 is different between the blocks 20 positioned in the inner region 4 and the blocks 20 positioned in the outer regions 5. That is, the blocks 20 positioned in the inner region 4 are defined into three or more small blocks 40 by the narrow grooves 30, and the blocks 20 positioned in the outer regions 5 are defined into a number of small blocks 40 by the narrow grooves 30, the number being at least one less than the number of the small blocks 40 defined in the blocks 20 positioned in the inner region 4.

Specifically, in the blocks 20 positioned in the inner region 4 (refer to FIG. 3), the lateral narrow groove 31 and the circumferential narrow grooves 32 of the narrow grooves 30 are connected to the circumferential main grooves 10 and the lug grooves 15, and the lateral narrow groove 31 and the circumferential narrow grooves 32 are connected to each other. Thus, the blocks 20 are divided into a plurality of regions in a plan view by the narrow grooves 30, each region being a small block 40. According to the present embodiment, four small blocks 40 are formed in each of the blocks 20 positioned in the inner region 4. That is, the blocks 20 positioned in the inner region 4 are each separated in the tire circumferential direction by the lateral narrow groove 31, and each of the regions separated in the tire circumferential direction are further separated in the tire lateral direction by the circumferential narrow grooves 32, thereby defining the block 20 into four of the small blocks 40.

Of these four small blocks 40, the small block 40 adjacent to the lug groove 15 that defines the leading side of the block 20 in the tire rotation direction and to the circumferential main groove 10 that defines the tire equator line CL side of the block 20 in the tire lateral direction is a leading-side block 41 that includes a portion of the block 20 positioned on the frontmost side in the tire rotation direction. In other words, the leading-side block 41 is adjacent to the lug groove 15 that, among the lug grooves 15 that define the block 20 that includes the leading-side block 41, is positioned on the leading side in the tire rotation direction, and to the circumferential main groove 10 that, among the circumferential main grooves 10 that define the block 20 that includes the leading-side block 41, is positioned on the tire equator line CL side.

That is, when the tread surface 3 of the pneumatic tire 1 contacts the road surface, contact is made from the portion relatively positioned on the leading side in the tire rotation direction and thus, in each of the blocks 20 as well, contact is made from the leading side in the tire rotation direction. Further, when the block 20 in contact with the ground separates from the road surface, separation is gradually made from the leading side to the trailing side in the tire rotation direction, with the portion positioned on the backmost side in the tire rotation direction separating last. As a result, during rotation of the pneumatic tire 1, each of the blocks 20 contacts the road surface first at a leading end in the tire rotation direction, bites into the road surface first at a leading end, then contacts the road surface at the very end of the trailing end in the tire rotation direction, and kicks off the road surface at the trailing end.

Furthermore, in the pneumatic tire 1 according to the present embodiment, at the edge portion 21 on the leading side of the block 20 in the tire rotation direction, an end portion on the tire equator line CL side in the tire lateral direction is positioned on the frontmost side in the tire rotation direction. Thus, of the four small blocks 40, the small block 40 adjacent to the lug groove 15 that defines the leading side of the block 20 in the tire rotation direction, and to the circumferential main groove 10 that defines the tire equator line CL side of the block 20 in the tire lateral direction is the small block 40 defined as the leading-side block 41 that first contacts the ground during rotation of the pneumatic tire 1.

In contrast, of the four small blocks 40, the small block 40 that includes a portion of the block 20 positioned on the backmost side in the tire rotation direction is a trailing-side block 42. That is, at the edge portion 21 on the trailing side of the block 20 in the tire rotation direction, an end portion on the outer side in the tire lateral direction is positioned on the backmost side in the tire rotation direction. Thus, of the four small blocks 40, the small block 40 adjacent to the lug groove 15 that defines the trailing side of the block 20 in the tire rotation direction, and to the circumferential main groove 10 that defines the outer side of the block 20 in the tire lateral direction is the small block 40 defined as the trailing-side block 42 that last separates from the road surface during rotation of the pneumatic tire 1.

Further, of the four small blocks 40, the two small blocks 40 other than the two small blocks 40 of the leading-side block 41 and the trailing-side block 42 are intermediate blocks 43. That is, of the four small blocks 40, the small block 40 adjacent to the lug groove 15 that defines the leading side of the block 20 in the tire rotation direction and to the circumferential main groove 10 that defines the outer side in the tire lateral direction, as well as the small block 40 adjacent to the lug groove 15 that defines the trailing side of the block 20 in the tire rotation direction and to the circumferential main groove 10 that defines the tire equator line CL side in the tire lateral direction are both intermediate blocks 43.

The small blocks 40 thus formed have surface areas in the plan view of the block 20 configured so that the surface area of the trailing-side block 42 is greater than that of the leading-side block 41, and the surface areas of the intermediate blocks 43 are each greater than that of the trailing-side block 42. Further, the surface areas of the two intermediate blocks 43 are each greater than those of the leading-side block 41 and the trailing-side block 42. That is, the surface areas of the four small blocks 40 increase in the order of the leading-side block 41<the trailing-side block 42<the intermediate blocks 43 (both), thus the surface area of the leading-side block 41 is the smallest.

Note that the surface area of the leading-side block 41 is preferably within a range of from 8 to 20%, inclusive, of the surface area of the block 20, and the surface area of the trailing-side block 42 is preferably within a range of from 12 to 30%, inclusive, of the block 20. Further, the two intermediate blocks 43 may have a relative relationship such that one of the surface areas of the two is greater than the other, as long as the surface areas of both are greater than those of the leading-side block 41 and the trailing-side block 42, any relative relationship between the two intermediate blocks 43 is not limited.

Further, in the blocks 20 positioned in the outer regions 5 (refer to FIG. 4), both ends of the lateral narrow groove 31 constituting the narrow groove 30 extend to both ends of the block 20 in the tire lateral direction, and thus the block 20 is divided into a number of regions by the narrow groove 30 in the plan view, the number being at least one less than the number of regions of the blocks 20 positioned in the inner region 4 (refer to FIG. 3). Each of these regions is one small block 40. According to the present embodiment, two small blocks 40 are formed in each of the blocks 20 positioned in the outer regions 5. That is, the blocks 20 positioned in the outer regions 5 are each separated in the tire circumferential direction by the lateral narrow groove 31, thereby defining the block 20 into two small blocks 40.

Of these two small blocks 40, the small block 40 adjacent to the lug groove 15 that defines the leading side of the block 20 in the tire rotation direction and to the circumferential main groove 10 that defines the tire equator line CL side of the block 20 in the tire lateral direction is the leading-side block 41 that includes a portion of the block 20 positioned on the frontmost side in the tire rotation direction. In other words, the leading-side block 41 is adjacent to the lug groove 15 that, among the lug grooves 15 that define the block 20 that includes the leading-side block 41, is positioned on the leading side in the tire rotation direction, and to the circumferential main groove 10 that is positioned on the tire equator line CL side and includes the leading-side block 41.

In contrast, of the two small blocks 40, the small block 40 that includes a portion of the block 20 positioned on the backmost side in the tire rotation direction is the trailing-side block 42. That is, of the two small blocks 40 of the block 20 positioned in the outer regions 5, the small block 40 positioned on the leading side of the narrow groove 30 in the tire rotation direction is the leading-side block 41, and the small block 40 positioned on the trailing side of the narrow groove 30 in the tire rotation direction is the trailing-side block 42.

These small blocks 40 thus formed have surface areas in the plan view of the block 20 configured so that the surface area of the trailing-side block 42 is greater than that of the leading-side block 41. That is, the surface area of the leading-side block 41 is less than that of the trailing-side block 42. Note that the surface area of the leading-side block 41 of the block 20 positioned in the outer regions 5 and divided into the two small blocks 40 by the narrow groove 30 is preferably within a range of from 30 to 50%, inclusive, of the block 20.

Further, each of the blocks 20 formed on the tread surface 3 is configured so that the relationship between the length LB in the tire circumferential direction and the width WB in the tire lateral direction is within a range of $0.9 \leq (LB/WB) \leq 1.6$. The width WB of the block 20 in this case is a distance between portions on both sides of the block 20 in the tire lateral direction that are farthest apart in the tire lateral direction. That is, the plurality of blocks 20 formed on the tread surface 3 are each formed substantially quadrangular, with the length LB in the tire circumferential direction being within a range of from 90 to 160%, inclusive, of the width WB in the tire lateral direction.

Figure 6:
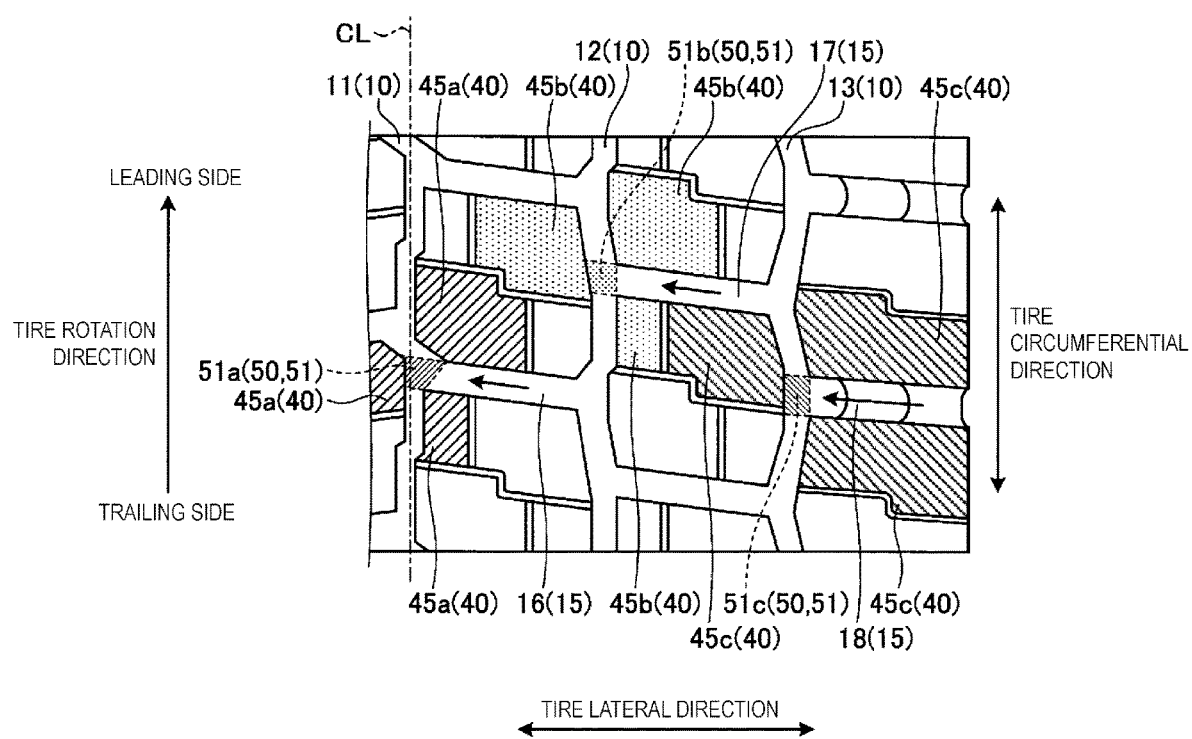
FIG. 6 is an explanatory diagram of intersection portions between circumferential main grooves and lug grooves, and is an explanatory diagram of outer intersection portions.

FIG. 6 is an explanatory diagram of intersection portions between circumferential main grooves and lug grooves, and is an explanatory diagram of outer intersection portions. The small blocks 40 of each of the blocks 20 are configured so that a total surface area of the plurality of small blocks 40 adjacent to intersection portions 50 between the circumferential main grooves 10 and the lug grooves 15 increases outward in the tire lateral direction from the tire equator line CL. For example, of the intersection portions 50 between the circumferential main grooves 10 and the lug grooves 15, each of the intersection portions 50 where the lug groove 15 is connected to the circumferential main groove 10 from the outer side in the tire lateral direction is defined as an outer intersection portion 51, and the total surface area of the plurality of small blocks 40 adjacent to one outer intersection portion 51 is defined as an outer intersection portion surface area AO. In this case, the plurality of outer intersection portion surface areas AO corresponding to the plurality of outer intersection portions 51 positioned in one region in the tire lateral direction from the tire equator line CL increase as the position of the outer intersection portion 51 in the tire lateral direction increases in distance from the tire equator line CL to the outer side in the tire lateral direction.

Specifically, the intersection portion 50 where the center circumferential main groove 11 and the center lug groove 16 is connected to the center circumferential main groove 11 from the outer side in the tire lateral direction is defined as a center outer intersection portion 51a, the intersection portion 50 where the middle circumferential main groove 12 and the middle lug groove 17 is connected to the middle circumferential main groove 12 from the outer side in the tire lateral direction is defined as a middle outer intersection portion 51b, and the intersection portion 50 where the shoulder circumferential main groove 13 and the shoulder lug groove 18 is connected to the shoulder circumferential main groove 13 from the outer side in the tire lateral direction is defined as a shoulder outer intersection portion 51c. In this case, a total of the surface areas of a plurality of the small blocks 40 defined as center outer intersection portion small blocks 45a adjacent to the center outer intersection portion 51a is defined as a center outer intersection portion surface area AOC, a total of the surface areas of a plurality of the small blocks 40 defined as middle outer intersection portion small blocks 45b adjacent to the middle outer intersection portion 51b is defined as a middle outer intersection portion surface area AOM, and a total of the surface areas of a plurality of the small blocks 40 defined as shoulder outer intersection portion small blocks 45c adjacent to the shoulder outer intersection portion 51c is defined as a shoulder outer intersection portion surface area AOS.

The relative relationship of the size of the surface areas of the center outer intersection portion surface area AOC corresponding to the center outer intersection portion 51a, the middle outer intersection portion surface area AOM corresponding to the middle outer intersection portion 51b, and the shoulder outer intersection portion surface area AOS corresponding to the shoulder outer intersection portion 51c is such that the center outer intersection portion surface area AOC<the middle outer intersection portion surface area AOM<the shoulder outer intersection portion surface area AOS. That is, the plurality of outer intersection portion surface areas AO increase as the position of the outer intersection portion 51 in the tire lateral direction increases in distance from the tire equator line CL to the outer side in the tire lateral direction.

Figure 7:
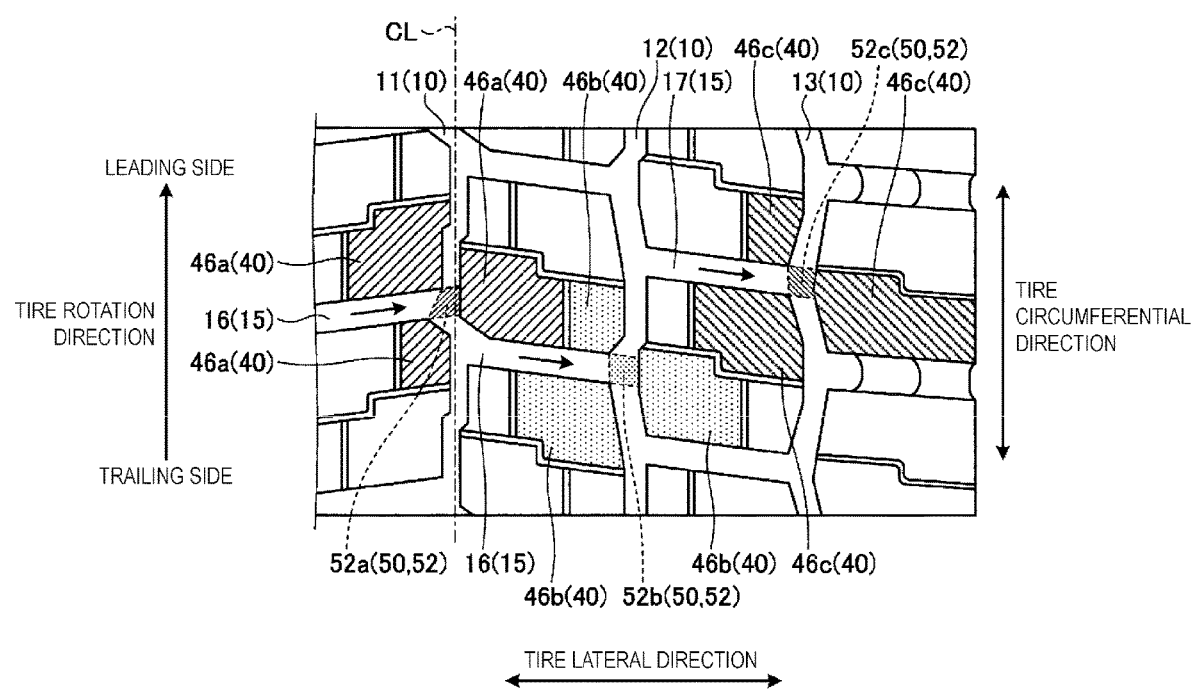
FIG. 7 is an explanatory diagram of the intersection portions between the circumferential main grooves and the lug grooves, and is an explanatory diagram of inner intersection portions.

FIG. 7 is an explanatory diagram of the intersection portions between the circumferential main grooves and the lug grooves, and is an explanatory diagram of inner intersection portions. Further, of the intersection portions 50 between the circumferential main grooves 10 and the lug grooves 15, each of the intersection portions 50 where the lug groove 15 is connected to the circumferential main groove 10 from the inner side in the tire lateral direction is defined as an inner intersection portion 52, and the total surface area of the plurality of small blocks 40 adjacent to one inner intersection portion 52 is defined as an inner intersection portion surface area AI. In this case, the plurality of inner intersection portion surface areas AI corresponding to the plurality of inner intersection portions 52 positioned in one region in the tire lateral direction from the tire equator line CL increase as the position of the inner intersection portion 52 in the tire lateral direction increases in distance from the tire equator line CL to the outer side in the tire lateral direction.

Specifically, the intersection portion 50 where the middle circumferential main groove 12 and the center lug groove 16 is connected to the middle circumferential main groove 12 from the inner side in the tire lateral direction is defined as a middle inner intersection portion 52b, and the intersection portion 50 where the shoulder circumferential main groove 13 and the shoulder lug groove 17 is connected to the shoulder circumferential main groove 13 from the inner side in the tire lateral direction is defined as a shoulder inner intersection portion 52c. Further, the intersection portions 50 between the circumferential main groove 10 positioned on the tire equator line CL and the lug groove 15 are configured such that each of the intersection portions 50 where the lug groove 15 is connected to the circumferential main groove 10 from one region side with the tire equator line CL as the boundary is defined as the inner intersection portion 52 positioned on the other region side with the tire equator line CL as the boundary. That is, the intersection portion 50 where the center lug groove 16 is connected to the center circumferential main groove 11 on the tire equator line CL from the region side opposite to the region side where the middle inner intersection portion 52b and the shoulder inner intersection portion 52c are positioned with the tire equator line CL as the boundary is defined as a center inner intersection portion 52a positioned in a region on the side where the middle inner intersection portion 52b and the shoulder inner intersection portion 52c are positioned with the tire equator line CL as the boundary.

In this case, a total of the surface areas of a plurality of the small blocks 40 defined as center inner intersection portion small blocks 46a adjacent to the center inner intersection portion 52a is defined as a center inner intersection portion surface area AIC, a total of the surface areas of a plurality of the small blocks 40 defined as middle inner intersection portion small blocks 46b adjacent to the middle inner intersection portion 52b is defined as a middle inner intersection portion surface area AIM, and a total of the surface areas of a plurality of the small blocks 40 defined as shoulder inner intersection portion small blocks 46c adjacent to the shoulder inner intersection portion 52c is defined as a shoulder outer intersection portion surface area AIS.

The relative relationship of the size of the surface areas of the center inner intersection portion surface area AIC corresponding to the center inner intersection portion 52a, the middle inner intersection portion surface area AIM corresponding to the middle inner intersection portion 52b, and the shoulder inner intersection portion surface area AIS corresponding to the shoulder inner intersection portion 52c is such that the center inner intersection portion surface area AIC<the middle inner intersection portion surface area AIM<the shoulder inner intersection portion surface area AIS. That is, the plurality of inner intersection portion surface areas AI increase as the position of the inner intersection portion 52 in the tire lateral direction increases in distance from the tire equator line CL to the outer side in the tire lateral direction.

Note that the outer intersection portion 51 and the inner intersection portion 52 with the same circumferential main groove 10 intersected by the lug groove 15 preferably have a relationship such that the outer intersection portion surface area AO corresponding to the outer intersection portion 51 and the inner intersection portion surface area A1 corresponding to the inner intersection portion 52 is within a range of 0.7≤(AO/AI)≤1.4.

Figure 8:
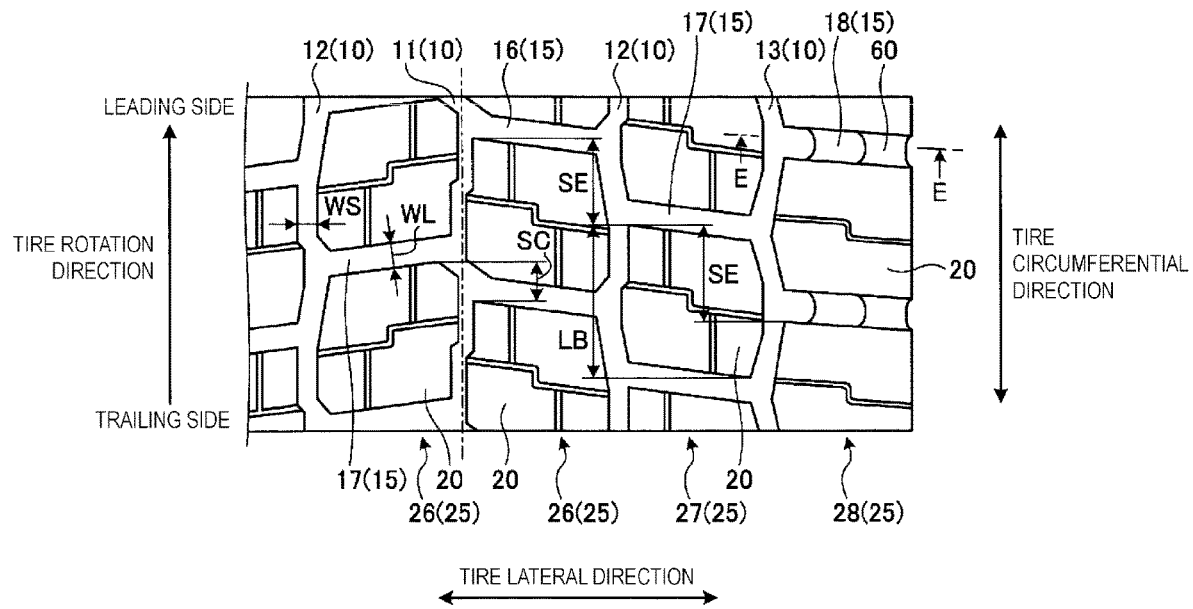
FIG. 8 is an explanatory diagram of an amount of shift between blocks adjacent to each other.

FIG. 8 is an explanatory diagram of an amount of shift between blocks adjacent to each other. The lug grooves 15 formed on the tread surface 3 are configured so that the lug grooves 15 adjacent via the circumferential main groove 10 differ in position in the tire circumferential direction, and thus the blocks 20 defined by the lugs grooves 15 are also configured so that the blocks 20 adjacent with the circumferential main groove 10 therebetween differ in position in the tire circumferential direction. At this time, the blocks 20 adjacent to each other with the circumferential main groove 10 therebetween are configured so that the blocks 20 adjacent to each other with the center circumferential main groove 11 therebetween and the blocks 20 adjacent to each other with one of the circumferential main grooves 10 other than the center circumferential main groove 11 therebetween differ in the amount of shift in the tire circumferential direction. This amount of shift in the tire circumferential direction of the blocks 20 is configured so that the amount of shift in the blocks 20 adjacent to each other with one of the circumferential main grooves 10 other than the center circumferential main groove 11 therebetween is greater than the amount of shift in the blocks 20 adjacent to each other with the center circumferential main groove 11 therebetween.

Specifically, a shift SC in the tire circumferential direction of the blocks 20 adjacent to each other with the center circumferential main groove 11 therebetween is within a range of from 0.05 to 0.2 times, inclusive, the length LB of the block 20 in the tire circumferential direction. In contrast, a shift SE in the tire circumferential direction of the blocks 20 adjacent to each other with one of the circumferential main grooves 10 other than the center circumferential main groove 11 therebetween is within a range of from 0.4 to 0.6 times, inclusive, the length LB of the block 20 in the tire circumferential direction. That is, both the shift SE in the tire circumferential direction of the blocks 20 adjacent to each other with the middle circumferential main groove 12 therebetween, and the shift SE in the tire circumferential direction of the blocks 20 adjacent to each other with the shoulder circumferential main groove 13 therebetween are within a range of from 0.4 to 0.6 times, inclusive, the length LB of the block 20 in the tire circumferential direction.

Further, the circumferential main grooves 10 and the lug grooves 15 that define one block 20 are configured so that the relationship between a groove width WS of the circumferential main groove 10 and a groove width WL of the lug groove 15 is within a range of 0.5≤(WS/WL)≤1.0. Note that while the groove width WS of the circumferential main groove 10 changes according to position while formed in a zigzag shape, the relationship of the groove width WS at any position with the groove width WL of the lug groove 15 is within the range of 0.5≤(WS/WL)≤1.0.

Figure 9:
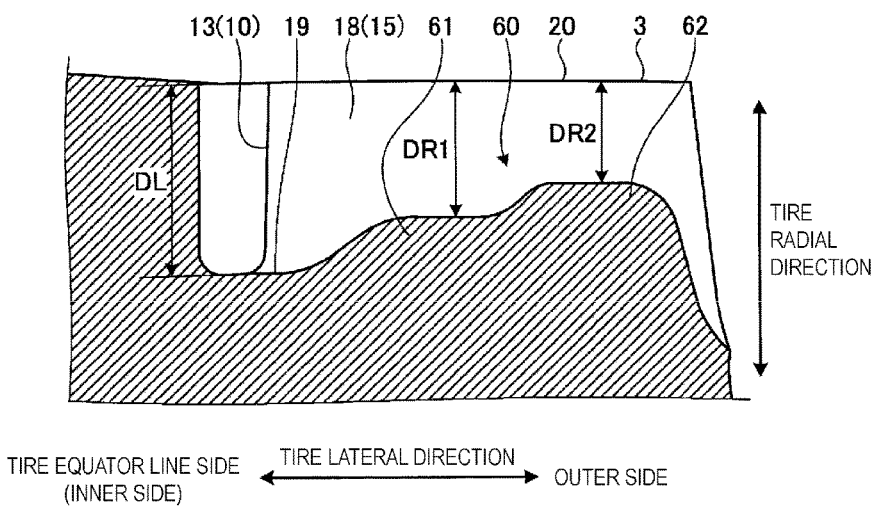
FIG. 9 is a cross-sectional view taken along E-E of FIG. 8.

FIG. 9 is a cross-sectional view taken along E-E of FIG. 8. In the shoulder lug groove 18 is formed a raised bottom portion 60 having a groove depth that gradually decreases from an inner side toward an outer side in the tire lateral direction. This raised bottom portion 60 is formed by raising a groove bottom 19 of the shoulder lug groove 18. A groove depth at the position of the raised bottom portion 60 gradually decreases by a gradual increase in a raised bottom height from the inner side to the outer side in the tire lateral direction.

Specifically, the raised bottom portion 60 is formed outward in the tire lateral direction of the position where the shoulder lug groove 18 is connected to the shoulder circumferential main groove 13, and includes a low step portion 61 having a relatively low raised bottom height and a high step portion 62 that is formed outward of the low step portion 61 in the tire lateral direction and has a raised bottom height greater than that of the low step portion 61. Thus, the groove depths of the shoulder lug groove 18 is configured so that a groove depth DR1 at the position of the low step portion 61 is less than a groove depth DL at a position where the raised bottom portion 60 is not formed, and a groove depth DR2 at the position of the high step portion 62 is less than the groove depth DR1 at the position of the low step portion 61. Thus, the raised bottom portion 60 is formed on the shoulder lug groove 18 so that the groove depth decreases in two steps from the inner side toward the outer side in the tire lateral direction.

Figure 10:
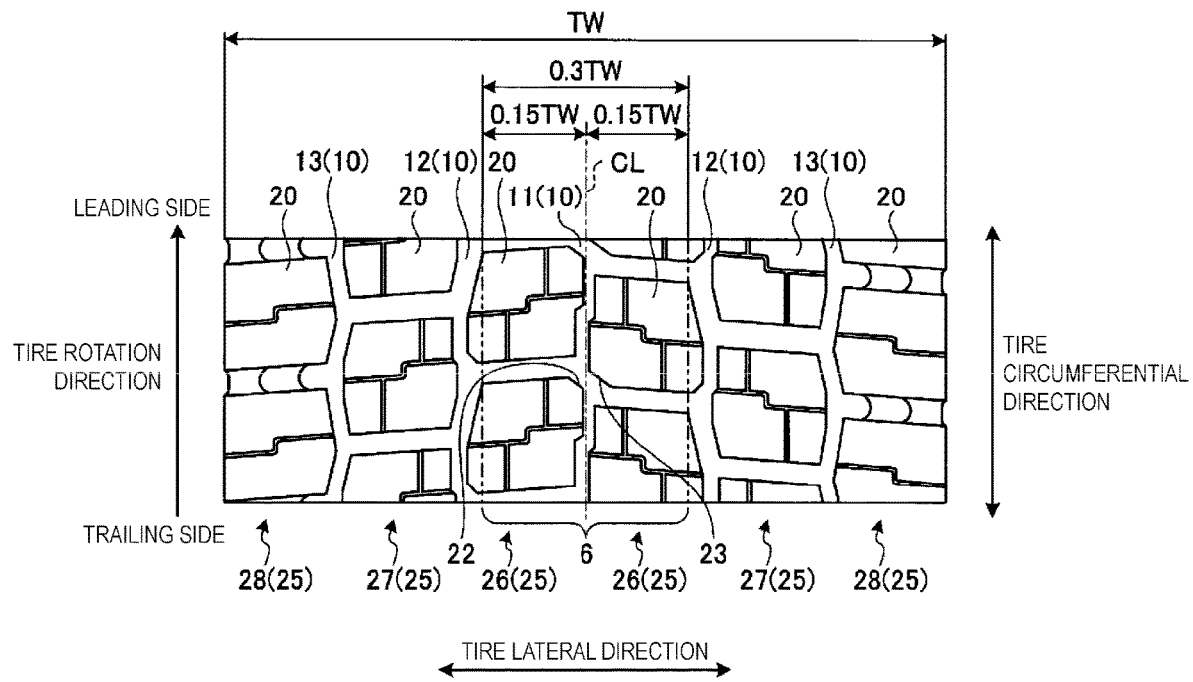
FIG. 10 is an explanatory diagram of a block positioned in a center region of the tread surface.

Further, of the plurality of blocks 20, the blocks 20 positioned in a center region 6, which is a periphery region of the tire equator line CL, are formed in shapes that are not symmetrical with the tire equator line CL as the axis of symmetry. FIG. 10 is an explanatory diagram of a block positioned in the center region of the tread surface. The center region 6 of the tread surface 3 is a region corresponding to 15% of a developed tread width TW from the tire equator line CL to both sides in the tire lateral direction. That is, the center region 6 is a region having a width in the tire lateral direction within a range of 30% of the developed tread width TW with the tire equator line CL as the center. The developed tread width TW in this case refers to a linear distance between the two ends of the tread portion 2 in a developed view when the pneumatic tire 1 is mounted on a regular rim and inflated to the regular inner pressure, and in a no load state in which a load is not applied.

Here, the blocks 20 positioned in areas other than the center region 6, while shifted in position in the tire circumferential direction in the regions on both sides in the tire lateral direction with the tire equator line CL as the center, have symmetrical shapes with the tire equator line CL as the axis of symmetry when the shape of the each block 20 is viewed individually. That is, the blocks 20 positioned in areas other than the center region 6 have symmetrical shapes with the tire equator line CL as the axis of symmetry when the positions of the blocks 20 in the tire circumferential direction are aligned in the regions on both sides in the tire lateral direction with the tire equator line L as the center.

In contrast, the blocks 20 positioned within the range of the center region 6 have asymmetrical shapes when the tire equator line CL is defined as the axis of symmetry. Specifically, the blocks 20 of the center block rows 26 positioned on both sides of the tire equator line CL in the tire lateral direction are positioned within the range of the center region 6, and the blocks 20 of the two center block rows 26 are asymmetrical with the tire equator line CL as the axis of symmetry.

For example, in the blocks 20 of one center block row 26 is formed a leading-side end portion chamfer 22, which is a chamfer formed at a portion where an edge on the tire equator line CL side in the tire lateral direction and an edge on the leading side in the tire rotation direction intersect. Further, in the blocks 20 of the other center block rows 26 is formed a trailing-side end portion chamfer 23, which is a chamfer formed at a portion where an edge on the tire equator line CL side in the tire lateral direction and an edge on the trailing side in the tire rotation direction intersect. Thus, the blocks 20 positioned within the range of the center region 6 on both sides of the tire equator line CL are configured with the leading-side end portion chamfer 22 formed in the blocks 20 of one side of the tire equator line CL and the trailing-side end portion chamfer 23 formed in the blocks 20 of the other side of the tire equator line CL, and are thus asymmetrical each other with the tire equator line CL as the axis of symmetry.

The pneumatic tire 1 according to the present embodiment thus configured is applied to a heavy duty pneumatic tire. When mounted on a vehicle, the pneumatic tire 1 is mounted on a rim wheel and then mounted with the rim on the vehicle in an inflated state. The pneumatic tire 1 mounted on the rim wheel is mounted on a large vehicle such as a truck or a bus, for example.

When a vehicle with the pneumatic tire 1 mounted thereon is driven, the pneumatic tire 1 rotates while the tread surface 3 of the tread surface 3 located at the bottom contacts the road surface. When a vehicle with the pneumatic tire 1 mounted thereon is driven on dry road surfaces, the vehicle is mainly driven by a friction force between the tread surface 3 and the road surface. This friction force transmits a driving force and a braking force to the road surface and generates a swivel force. Further, when the vehicle is driven on wet road surfaces, the vehicle is driven while water between the tread surface 3 and the road surface enters the circumferential main grooves 10, the lug grooves 15, and the like, and is discharged by these grooves. In this way, the tread surface 3 readily contacts the road surface, allowing the vehicle to be driven by the friction force between the tread surface 3 and the road surface.

Further, when the vehicle is driven on icy and snowy road surfaces, the edges serving as boundary portions between the tread surface 3 and the grooves get caught on the icy and snowy road surfaces, making it possible to produce resistance between the tread surface 3 and the icy and snowy road surfaces and generate traction. Additionally, in the pneumatic tire 1 according to the present embodiment, the narrow grooves 30 are formed in the blocks 20, dividing the blocks 20 into the small blocks 40. Accordingly, the number of edge components of each of the blocks 20 increases and the number of edge components of the tread surface 3 in its entirety increases, making it possible to ensure traction performance as well as performance on snow and ice during travel on icy and snowy road surfaces.

Further, the pneumatic tire 1 according to the present embodiment has a specified rotation direction and, among the plurality of small blocks 40 of the blocks 20, the leading-side block 41 has the smallest surface area. The leading-side block 41 is the small block 40 that first contacts the ground upon ground contact by the block 20. With this leading-side block 41 having the smallest surface area, a hitting sound at the time of contact can be reduced. That is, when the block 20 separated from the road surface contacts the road surface, the hitting sound produced when the block 20 makes contact tends to increase in volume in proportion to an increase in the surface area of the block 20. Thus, with the surface area of the leading-side block 41 that first contacts the ground upon ground contact by the block 20 being the smallest, the production of a loud hitting sound at the time of contact can be suppressed. In this way, the noise produced when the tread surface 3 contacts the road surface during rotation of the pneumatic tire 1 can be reduced.

Further, the surface areas of the small blocks 40 are configured so that the surface area of the trailing-side block 42 is greater than that of the leading-side block 41, making it possible to increase the surface area of the small blocks 40 that last separate from the road surface when the blocks 20 contact the ground while the pneumatic tire 1 is rolling. Accordingly, slippage on the trailing side of the block 20 in the tire rotation direction can be suppressed, and heal and toe wear can be suppressed. That is, in the block pattern, normally the trailing side of the block 20, that is, the area near the trailing end side in the tire rotation direction, readily slips at the time of kickoff of the block 20. Further, the trailing side significantly wears compared to the leading side of the block 20, readily causing so-called heal and toe wear. In contrast, in the pneumatic tire 1 according to the present embodiment, the small blocks 40 have surface areas configured so that the surface area of the trailing-side block 42 is greater than that of the leading-side block 41, thereby imparting the small blocks 40 on the trailing side with increased block rigidity compared to the small blocks 40 on the leading side. In this way, movement of the small block 40 that last separates from the road surface at the time of kickoff of the block 20 can be decreased and a susceptibility to slippage on the road surface can be reduced, making it possible to suppress wear caused by the small block 40 moving and slipping on the road surface.

Further, in contrast to the blocks 20 positioned in the inner region 4 being defined into three or more small blocks 40, the blocks 20 positioned in the outer regions 5 are defined into a number of small blocks 40 that is less than the number of the small blocks 40 defined in the blocks 20 positioned in the inner region 4, making it possible to improve uneven wear resistance. That is, a circumferential length of each of the outer regions 5 is less than a circumferential length of the inner region 4 and thus, during normal travel, the tread surface 3 readily slips on the road surface in the outer regions 5. As a result, while the blocks 20 positioned in the outer regions 5 are susceptible to uneven wear such as heal and toe wear, the number of small blocks 40 defined in the blocks 20 positioned in the outer regions 5 is less than the number of small blocks 40 defined in the blocks 20 positioned in the inner region 4, making it possible to suppress heal and toe wear. That is, with a decrease in the number of small blocks 40 defined in the blocks 20 positioned in the outer regions 5, it is possible to ensure the block rigidity of the blocks 20 and thus suppress slippage at the time of kickoff of the block 20 as well as heal and toe wear. As a result, it is possible to improve uneven wear resistance and reduce noise in a compatible manner.

Further, in the blocks 20, the relationship between the length LB in the tire circumferential direction and the width WB in the tire lateral direction is within the range of 0.9≤(LB/WB)≤1.6, making it possible to ensure the rigidity in the tire circumferential direction and the rigidity in the tire lateral direction of the block 20 in a well-balanced manner. That is, when the relationship between the length LB in the tire circumferential direction and the width WB in the tire lateral direction of the block 20 is (LB/WB)≤0.9, the length LB in the tire circumferential direction of the block 20 is too short, possibly causing the block rigidity in the tire circumferential direction to be too low. In this case, the block 20 readily deforms in the tire circumferential direction, and thus reception of a load that acts in the tire circumferential direction by the block 20 without the occurrence of deformation is difficult, possibly causing a decrease in traction performance. Further, when the relationship between the length LB in the tire circumferential direction and the width WB in the tire lateral direction of the block 20 is (LB/WB) >1.6, the width WB in the tire lateral direction of the block 20 is too narrow, possibly causing the block rigidity in the tire lateral direction to be too low. In this case, the block 20 readily deforms at the time of kickoff of the block 20, possibly causing difficulties in effectively suppressing heal and toe wear. In contrast, when the relationship between the length LB in the tire circumferential direction and the width WB in the tire lateral direction of the block 20 is within the range of 0.9≤(LB/WB)≤1.6, it is possible to ensure the rigidity in the tire circumferential direction and the rigidity in the tire lateral direction of the block 20 in a well-balanced manner. As a result, uneven wear resistance can be more reliably improved while ensuring traction performance.

Further, the leading-side block 41 is adjacent to the circumferential main groove 10 that, among the circumferential main grooves 10 that define the block 20, is positioned on the tire equator line CL side, making it possible to more reliably reduce the noise produced when the tread surface 3 contacts the ground. That is, when the tread surface 3 contacts the road surface, a ground contact pressure in a central region in the tire lateral direction of the ground contact region increases. As a result, a loud hitting sound is readily produced when the region on the tire equator line CL side in the tire lateral direction contacts the ground during ground contact by each of the blocks 20. Thus, of the plurality of small blocks 40, the leading-side block 41 having the smallest surface area is positioned adjacent to the circumferential main groove 10 that defines the tire equator line CL side of the block 20, thereby making it possible to effectively reduce the hitting sound when the region where the ground contact pressure is high and readily produces a loud hitting sound upon ground contact contacts the ground. As a result, the noise produced when the tread surface 3 contacts the road surface during rotation of the pneumatic tire 1 can be more reliably reduced.

Further, the plurality of outer intersection portion surface areas AO corresponding to the plurality of outer intersection portions 51 and the plurality of inner intersection portion surface areas AI corresponding to the plurality of inner intersection portions 52 increase as the positions of the outer intersection portion 51 and the inner intersection portion 52 in the tire lateral direction increase in distance from the tire equator line CL to the outer side in the tire lateral direction, making it possible to increase the block rigidity at positions near the outer regions 5. In this way, the block rigidity in positions near the outer regions 5, which are regions susceptible to heal and toe wear, can be increased, making it possible to more reliably suppress heal and toe wear. As a result, uneven wear resistance can be more reliably improved.

Further, the relationship between the outer intersection portion surface area AO of the outer intersection portion 51 and the inner intersection portion surface area A1 of the inner intersection portion 52 with the same circumferential main groove 10 is within the range of 0.7≤(AO/AI)≤1.4, making it possible to suppress bias in block rigidity when each of the blocks 20 are defined into the plurality of blocks 40. As a result, uneven wear caused by bias in block rigidity can be suppressed, making it possible to more reliably improve uneven wear resistance.

Further, the intersection portions 50 positioned on the tire equator line CL are configured so that each of the intersection portions 50 where the lug groove 15 is connected from one region side with the tire equator line CL as the boundary is defined as the inner intersection portion 52 positioned on the other region side, thereby increasing the inner intersection portion surface area AI, including the inner intersection portion surface area AI corresponding to this inner intersection portion 52 as the distance from the tire equator line CL to the outer side in the tire lateral direction increases, making it possible to more reliably increase the block rigidity in positions near the outer regions 5. In this way, the block rigidity in positions near the outer regions 5, which are regions susceptible to heal and toe wear, can be increased, making it possible to more reliably suppress heal and toe wear. As a result, uneven wear resistance can be more reliably improved.

Further, among the blocks 20 adjacent to each other with the circumferential main groove 10 therebetween, the blocks 20 adjacent with the center circumferential main groove 11 therebetween and the blocks 20 adjacent with one of the circumferential main grooves 10 other than the center circumferential main groove 11 therebetween differ in the amount of shift in the tire circumferential direction, allowing the period lengths of the hitting sound produced when the blocks 20 contact the ground to differ between regions near the center circumferential main groove 11 and other regions. In this way, the noise produced when the tread surface 3 contacts the road surface during rotation of the pneumatic tire 1 can be more reliably reduced. As a result, noise reduction can be more reliably reduced.

Further, the shift SC in the tire circumferential direction of the blocks 20 adjacent to each other with the center circumferential main groove 11 therebetween is within the range of from 0.05 to 0.2 times, inclusive, the length LB of the block 20 in the tire circumferential direction, thereby making it possible to receive loads by a greater number of the small blocks 40 in the central region in the tire lateral direction that is susceptible to increases in ground contact pressure. That is, in the blocks 20 adjacent to each other with the center circumferential main groove 11 therebetween, the shift SC in the tire circumferential direction is small, and thus the distance between the small blocks 40 of the blocks 20 is also small. In this way, loads that readily increase by an increase in ground contact pressure can be dispersed to a greater number of the small blocks 40, making it possible to suppress uneven wear caused by differences in the magnitude of the loads between the small blocks 40.

Further, the shift SE in the tire circumferential direction of the blocks 20 adjacent to each other with one of the circumferential main grooves 10 other than the center circumferential main groove 11 therebetween is within the range of from 0.4 to 0.6 times, inclusive, the length LB of the block 20 in the tire circumferential direction, thereby making the sound that flows through the lug grooves 15 less likely to be transmitted between different lug grooves 15. In this way, it is possible to suppress the noise produced when the tread surface 3 contacts the road surface from traveling through the lug grooves 15 and escaping to the outer side in the tire lateral direction. As a result, it is possible to more reliably improve uneven wear resistance and reduce noise in a compatible manner.

Further, the circumferential main grooves 10 and the lug grooves 15 that define one block 20 are configured so that the relationship between the groove width WS of the circumferential main groove 10 and the groove width WL of the lug groove 15 is within a range of $0.5 \leq (WS/WL) \leq 1.0$, making it possible to more reliably suppress noise and uneven wear while ensuring drainage properties. That is, when the relationship between the groove width WS of the circumferential main groove 10 and the groove width WL of the lug groove 15 is (WS/WL)<0.5, either the groove width WS of the circumferential main groove 10 may be too narrow or the groove width WL of the lug groove 15 may be too wide. When the groove width WS of the circumferential main groove 10 is too narrow, water does not readily flow into the circumferential main groove 10 during travel on wet road surfaces, possibly causing a decrease in driving performance during travel on wet road surfaces. Further, when the groove width WL of the lug groove 15 is too wide, an interval between the blocks 20 adjacent to each other in the tire circumferential direction with the lug groove 15 therebetween increases in size, possibly making it more difficult to effectively reduce the hitting noise produced when the block 20 contacts the ground.

Further, when the relationship between the groove width WS of the circumferential main groove 10 and the groove width WL of the lug groove 15 is (WS/WL)>1.0, either the groove width WS of the circumferential main groove 10 may be too wide or the groove width WL of the lug groove 15 may be too narrow. Further, when the groove width WS of the circumferential main groove 10 is too wide, an interval between the blocks 20 adjacent to each other with the circumferential main groove 10 therebetween increases in size, making it more difficult to disperse the load that acts on the area surrounding the block 20 to a greater number of blocks 20. In this case, a large load may act on a portion of the blocks 20, possibly causing both ends of the blocks 20 in the tire circumferential direction to wear and uneven wear to occur within the block 20. Further, when the groove width WL of the lug groove 15 is too narrow, water does not readily flow into the lug groove 15 during travel on wet road surfaces, possibly causing a decrease in driving performance during travel on wet road surfaces.

In contrast, when the relationship between the groove width WS of the circumferential main groove 10 and the groove width WL of the lug groove 15 is within the range of $0.5 \leq (WS/WL) \leq 1.0$, it is possible to more reliably suppress the noise produced when the tread surface 3 contacts the road surface and suppress uneven wear within the block 20 while ensuring the drainage properties of the circumferential main groove 10 and the lug groove 15. As a result, it is possible to more reliably improve uneven wear resistance and reduce noise in a compatible manner while ensuring wet performance.

Further, the raised bottom portion 60 having a groove depth that gradually decreases from the inner side to the outer side in the tire lateral direction is formed in the shoulder lug groove 18, making it possible to more reliably suppress the noise produced when the tread surface 3 contacts the ground. That is, when the noise, produced when the block 20 contacts the ground, flows through the lug groove 15 and in the tire lateral direction, this noise comes into contact with the raised bottom portion 60 of the shoulder lug groove 18, making it possible to keep the noise from escaping from the shoulder lug groove 18 to the outer side in the tire lateral direction. At this time, the raised bottom portion 60 is formed so that the groove depth gradually decreases from the inner side toward the outer side in the tire lateral direction, making it possible to gradually attenuate the noise that flows through the shoulder lug groove 18 from the inner side toward the outer side in the tire lateral direction at the raised bottom portion 60. That is, the raised bottom portion 60 is formed so that the groove depth gradually decreases, and thus is provided with a plurality of reflective surfaces to the noise, each at a different angle, thereby making it possible to reflect the noise that flows through the shoulder lug groove 18 toward the outer side in the tire lateral direction by the plurality of reflective surfaces at different angles, and thus gradually attenuate the noise. In this way, the noise that flows through the shoulder lug groove 18 can be more reliably suppressed from escaping from the shoulder lug groove 18 to the outer side in the tire lateral direction.

Further, with the raised bottom portion 60 formed in the shoulder lug groove 18, the rigidity of the blocks 20 of the shoulder block row 28 can be improved, making it possible to improve the rigidity of the blocks 20 positioned in regions susceptible to heal and toe wear readily and suppress such heal and toe wear. At this time, while susceptibility to heal and toe wear increases as the position in the tire lateral direction is further toward the outer side in the tire lateral direction, the raised bottom portion 60 is formed so that the groove depth gradually decreases from the inner side toward the outer side in the tire lateral direction, making it possible to increase the rigidity of the blocks 20 of the shoulder block row 28 from the inner side toward the outer side in the tire lateral direction. In this way, heal and toe wear can be more reliably suppressed. As a result, it is possible to more reliably improve uneven wear resistance and reduce noise in a compatible manner.

Further, the portion of the blocks 20 positioned in the center region 6 have asymmetrical shapes when the tire equator line CL as the axis of symmetry, and thus pattern noise can be reduced while suppressing uneven wear. That is, the portion of the blocks 20 positioned in the center region 6 are formed into asymmetrical shapes with the tire equator line CL as the axis of symmetry and thus, in the center region 6, the shapes of the tread patterns can be made to differ in the regions on both sides of the tire equator line CL in the tire lateral direction, and the pattern noise can be made to differ in the regions on both sides of the tire equator line CL in the tire lateral direction. Accordingly, the period lengths of the pattern noise can be dispersed, and the pattern noise can be reduced. Further, in positions near both ends in the tire lateral direction susceptible to heal and toe wear, the blocks 20 are formed into line symmetrical shapes with the tire equator line CL as the axis of symmetry, making it possible to suppress uneven wear caused by a difference in the way the load acts on the blocks 20. In other words, the blocks 20 are formed into line symmetrical shapes with the tire equator line CL as the axis of symmetry in regions susceptible to uneven wear, and into asymmetrical shapes with the tire equator line CL as the axis of symmetry in regions not susceptible to uneven wear, making it possible to reduce pattern noise while suppressing uneven wear. As a result, it is possible to more reliably improve uneven wear resistance and reduce noise in a compatible manner.

Figure 11:
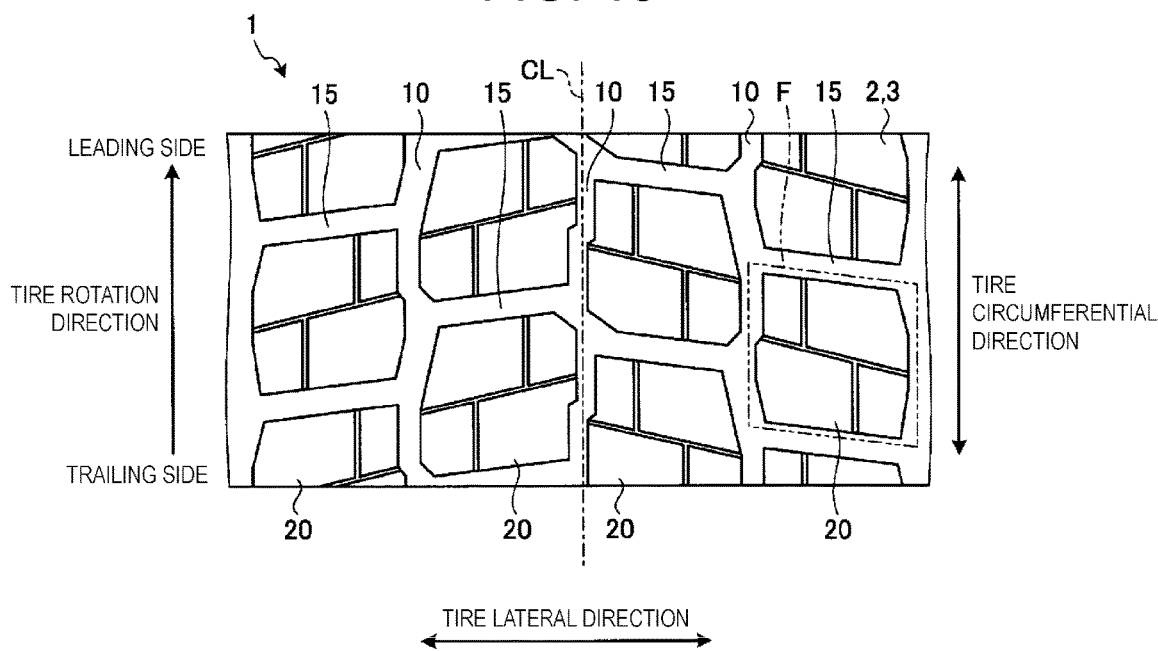
FIG. 11 is a modified example of the pneumatic tire according to the embodiment, and is an explanatory diagram of a case where a lateral narrow groove is not provided with a bent portion.
Figure 12:
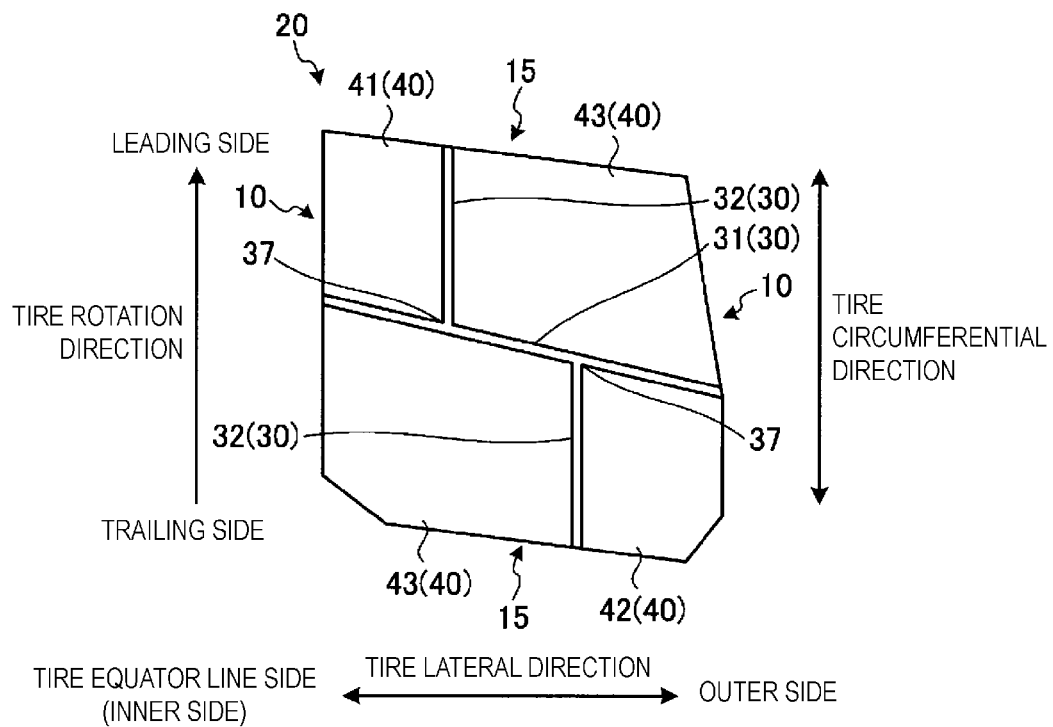
FIG. 12 is a detailed view of a part F of FIG. 11.

Note that while, in the pneumatic tire 1 according to the embodiment described above, the lateral narrow groove 31 formed in the block 20 positioned in the inner region 4 includes the bent portion 35, the lateral narrow groove 31 does not need to include the bent portion 35. FIG. 11 is a modified example of the pneumatic tire according to the embodiment, and is an explanatory diagram of a case where the lateral narrow groove is not provided with the bent portion. FIG. 12 is a detailed view of a part F of FIG. 11. The lateral narrow groove 31, as illustrated in FIGS. 11 and 12, for example, may be linearly formed between the circumferential main grooves 10 positioned on both sides of the block 20 in the tire lateral direction. Even when the lateral narrow groove 31 does not include the bent portion 35, as long as the blocks 20 positioned in the inner region 4 are defined into the plurality of small blocks 40 by the lateral narrow groove 31 and the circumferential narrow groove 32 making, among the plurality of small blocks 40, the surface area of the leading-side block 41 less than the surface area of the trailing-side block 42, the shape of the lateral narrow groove 31 is not limited.

Figure 13:
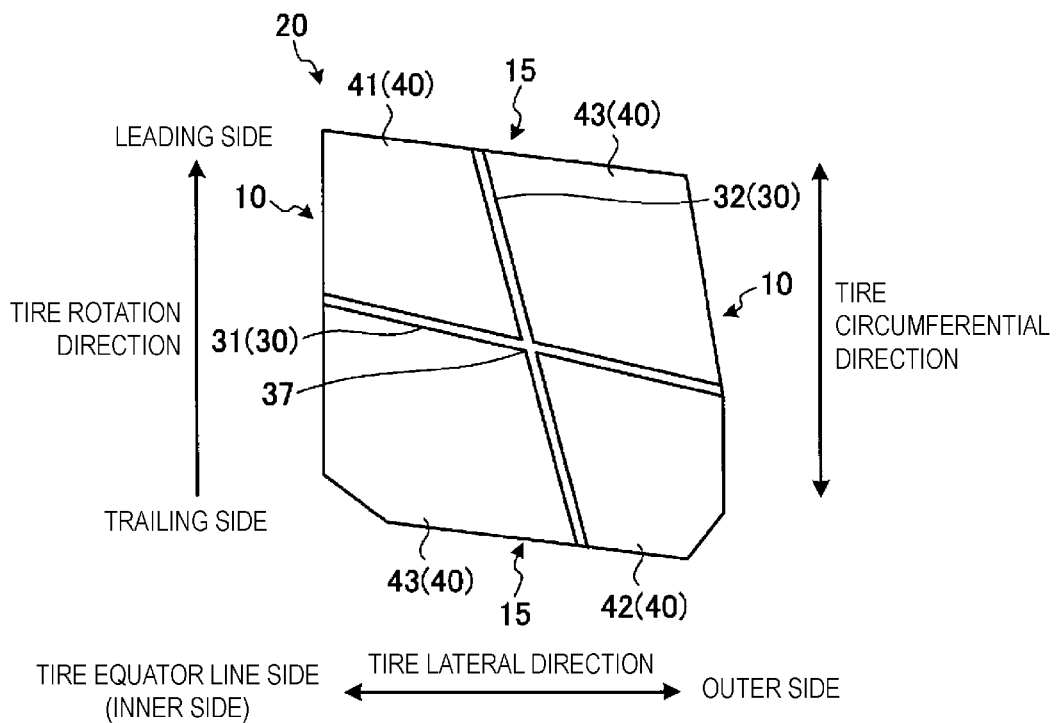
FIG. 13 is a modified example of the pneumatic tire according to the embodiment, and is an explanatory diagram of a case where the number of intersection points is other than two.

Further, while in the pneumatic tire 1 according to the embodiment described above, two circumferential narrow grooves 32 are connected to the lateral narrow groove 31 at the two intersection points 37 in the blocks 20 positioned in the inner region 4, the number of intersection points between the circumferential narrow groove 32 and the lateral narrow groove 31 does not need to be two. FIG. 13 is a modified example of the pneumatic tire according to the present embodiment, and is an explanatory diagram of a case where the number of intersection points is other than two. The number of the intersection points 37 between the circumferential narrow groove 32 and the lateral narrow groove 31 may be one, for example, as illustrated in FIG. 13. That is, one lateral narrow groove 31 may be formed across the two circumferential main grooves 10 that define the block 20 in the tire lateral direction, and one circumferential narrow groove 32 may be formed across the two lug grooves 15 that define the block 20 in the tire circumferential direction, thereby intersecting the lateral narrow groove 31 at the one intersection point 37. The number of the intersection points 37 between the circumferential narrow groove 32 and the lateral narrow groove 31 may be other than two as long as the block 20 positioned in the inner region 4 is defined into three or more small blocks 40.

Figure 14:
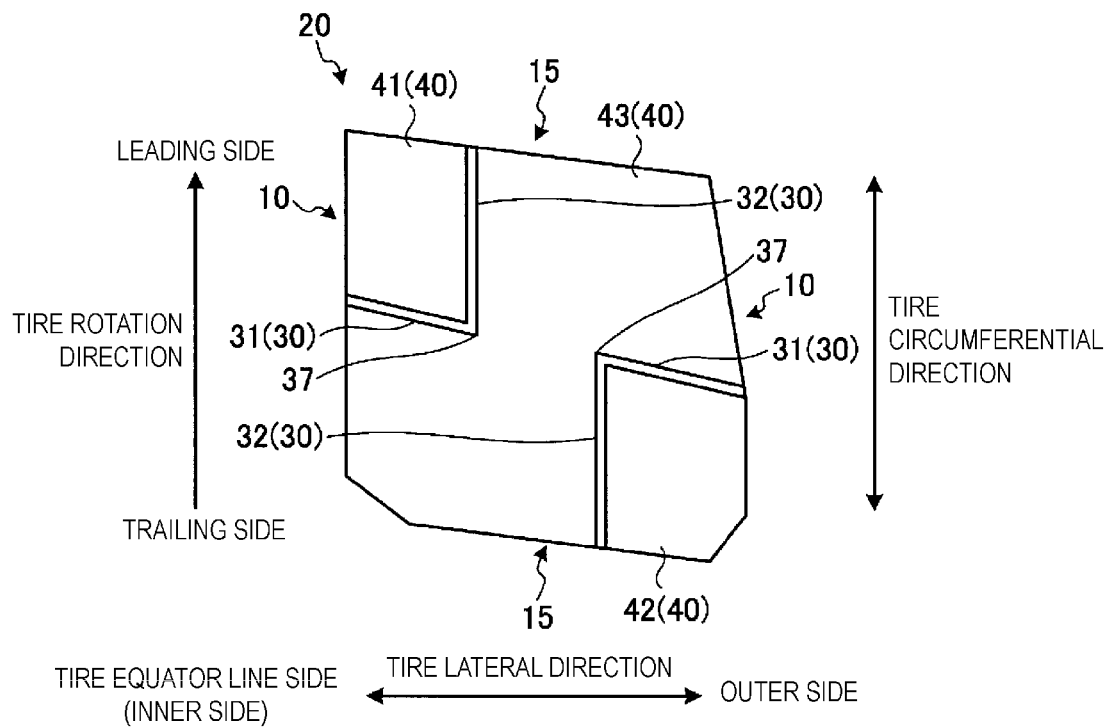
FIG. 14 is a modified example of the pneumatic tire according to the embodiment, and is an explanatory diagram of a case where the number of small blocks is other than four.

Further, while in the pneumatic tire 1 according to the embodiment described above one of the blocks 20 positioned in the inner region 4 is defined into the four small blocks 40, the number of the small blocks 40 formed in one of the blocks 20 may be other than four. FIG. 14 is a modified example of the pneumatic tire according to the embodiment, and is an explanatory diagram of a case where the number of small blocks is other than four. The number of small blocks 40 formed in one of the blocks 20 positioned in the inner region 4 may be three, for example, as illustrated in FIG. 14. The number of small blocks 40 formed in one of the blocks 20 positioned in the inner region 4 may be three or more, and the shape of the small blocks 40 may be a shape other than rectangular as in the intermediate block 43 illustrated in FIG. 14.

Further, the lateral narrow groove 31 does not need to open to both circumferential main grooves 10 that define both sides of one block 20 in the tire lateral direction, and the circumferential narrow groove 32 does not need to open to both lug grooves 15 that define both sides of the block 20 in the tire circumferential direction. For example, as illustrated in FIG. 14, one lateral narrow groove 31 may simply open to one circumferential main groove 10, and one circumferential narrow groove 32 may simply open to one lug groove 15. The narrow groove 30 does not need to be formed across from one end side to the other end side of the block 20 in the tire lateral direction or the tire circumferential direction as long as one block 20 is defined into three or more small blocks 40.

Figure 15:
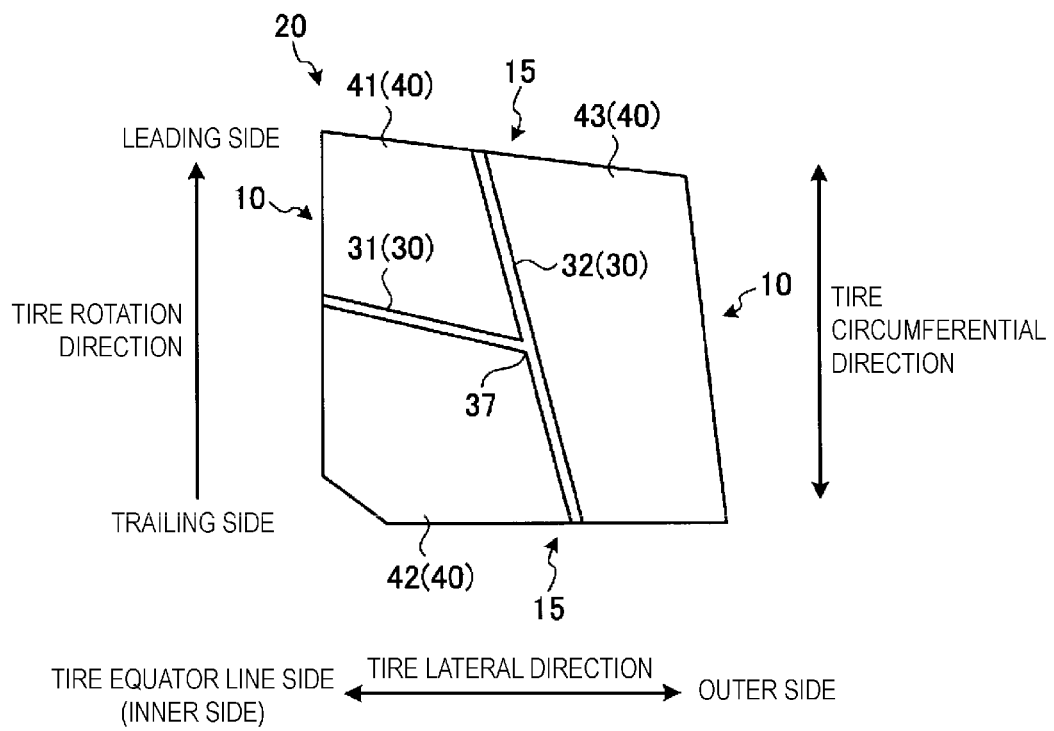
FIG. 15 is a modified example of the pneumatic tire according to the embodiment, and is an explanatory diagram of a case where a trailing-side block is disposed in a position other than an outer side in the tire lateral direction.

Further, while in the pneumatic tire 1 according to the embodiment described above, the trailing-side block 42 of the block 20 positioned in the inner region 4 is disposed in a position adjacent to the circumferential main groove 10 that defines the outer side of the block 20 in the tire lateral direction, the trailing-side block 42 may be disposed in a position other that this in the block 20. FIG. 15 is a modified example of the pneumatic tire according to the embodiment, and is an explanatory diagram of a case where the trailing-side block is disposed in a position other than the outer side in the tire lateral direction. The trailing-side block 42, for example, as illustrated in FIG. 15, may be adjacent to the lug groove 15 that defines the trailing side of the block 20 in the tire rotation direction, and to the circumferential main groove 10 that defines the tire equator line CL side of the block 20 in the tire rotation direction. The trailing-side block 42 may be in any position in the tire lateral direction as long as the trailing side block 42 is formed so as to include a back end of the block 20 in the tire rotation direction.

Figure 16:
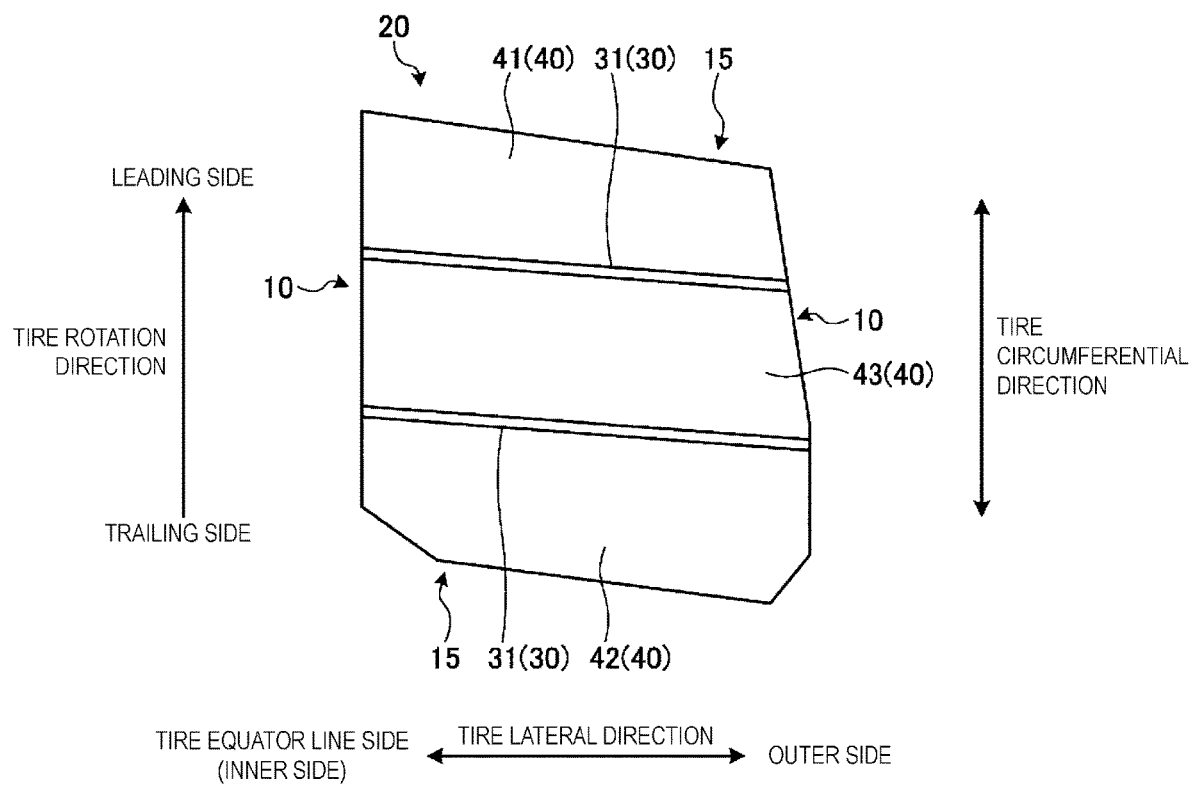
FIG. 16 is a modified example of the pneumatic tire according to the embodiment, and is an explanatory diagram of a case where three or more small blocks are defined by the lateral narrow grooves only.

Further, while in the pneumatic tire 1 according to the embodiment described above the blocks 20 positioned in the inner region 4 are each defined into three or more small blocks 40 by the lateral narrow groove 31 and the circumferential narrow grooves 32, the narrow grooves 30 may define one of the blocks 20 into three or more small blocks 40 by other configurations. FIG. 16 is a modified example of the pneumatic tire according to the embodiment, and is an explanatory diagram of a case where three or more small blocks are defined by lateral narrow grooves only. The blocks 20 positioned in the inner region 4 may be provided with a plurality of the lateral narrow grooves 31 aligned in the tire circumferential direction, defining three or more small blocks 40 and, for example, may be provided with two lateral narrow grooves 31 aligned in the tire circumferential direction, defining each of the blocks 20 into three small blocks 40. As long as the block 20 positioned in the inner region 4 are each defined into three or more small blocks 40, the narrow grooves 30 do no need to include both the lateral narrow groove 31 and the circumferential narrow groove 32.

Figure 17:
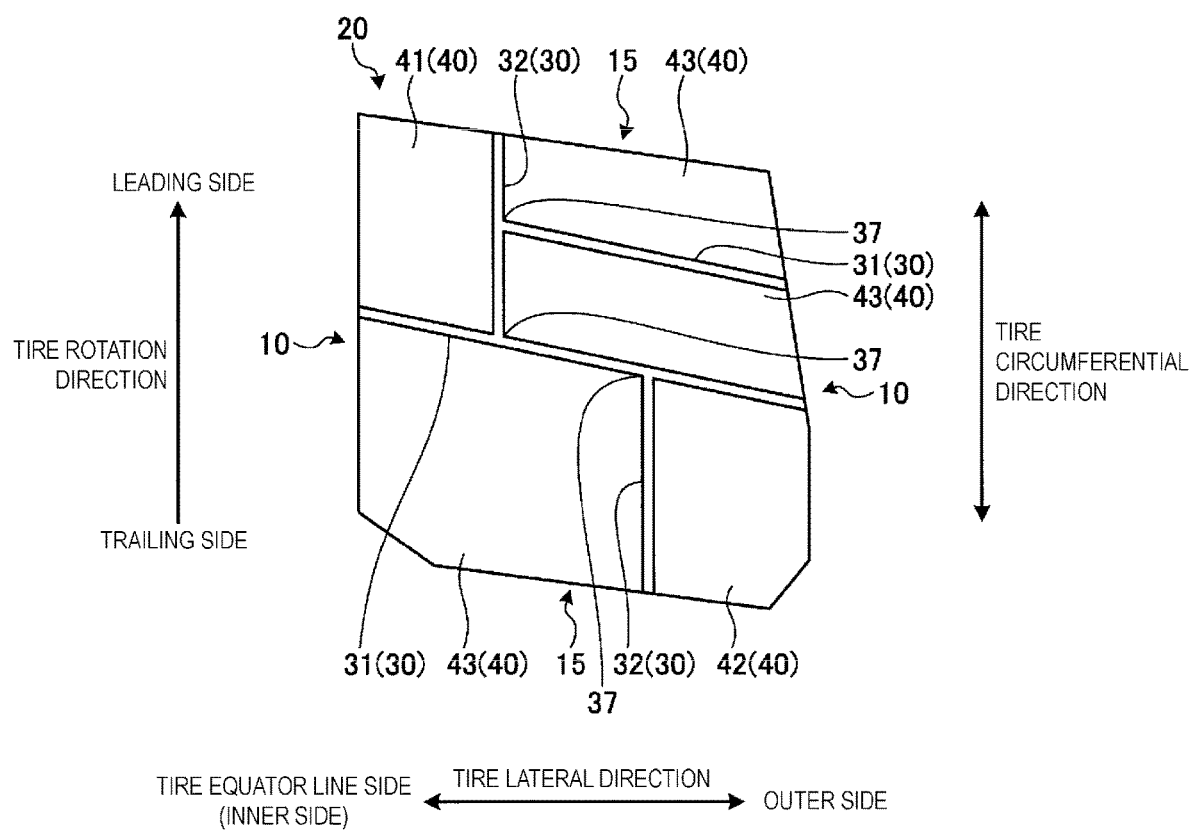
FIG. 17 is a modified example of the pneumatic tire according to the embodiment, and is an explanatory diagram of a case where the circumferential narrow grooves intersect the lateral narrow grooves in a plurality of locations.

Further, while in the pneumatic tire 1 according to the embodiment described above, the circumferential narrow groove 32 formed in the block 20 positioned in the inner region 4 only intersects the lateral narrow groove 31 at one intersection point 37, the circumferential narrow groove 32 may intersect the lateral narrow groove 31 at a plurality of locations. FIG. 17 is a modified example of the pneumatic tire according to the present embodiment, and is an explanatory diagram of a case where the circumferential narrow grooves intersect the lateral narrow grooves in a plurality of locations. The circumferential narrow grooves 32 formed in the block 20 may, for example, not only intersect the lateral narrow groove 31 at the end portion of the circumferential narrow groove 32, but further intersect another lateral narrow groove 31 at a position between both end portions of the circumferential narrow groove 32, as illustrated in FIG. 17. As long as the block 20 is defined into the plurality of small blocks 40, making the surface area of the leading-side block 41 less than the surface area of the trailing-side block 42, the form of intersection between the circumferential narrow groove 32 and the lateral narrow groove 31 is not limited.

Further, while in the pneumatic tire 1 according to the embodiment described above the narrow grooves 30 are configured so that the groove depth d1 of the lateral narrow groove 31 is greater than the groove depth d2 of the circumferential narrow groove 32, the groove depth d2 of the circumferential narrow groove 32 may be greater than the groove depth d1 of the lateral narrow groove 31. Further, the groove depth of the narrow groove 30 may differ for each of the blocks 20, and may be formed at three or more depths within each of the blocks 20. Further, the narrow grooves 30 may be configured so that, for example, the lateral narrow groove 31 is a regular groove in which the groove walls are continuously spaced apart even when the block 20 contacts the ground, and the circumferential narrow groove 32 may be formed by a sipe or the like, resulting in a mixture of regular groove and sipes.

Thus, as long as the narrow grooves 30 define the blocks 20 so that the blocks 20 positioned in the inner region 4 are defined into three or more small blocks 40, and the blocks 20 positioned in the outer regions 5 are defined into a number of small blocks 40 that is at least one less than the number of the small blocks 40 of the blocks 20 positioned in the inner region 4, making the surface area of the leading-side block 41 less than the surface area of the trailing-side block 42, the presence or absence of the bent portion 35, the number of intersection points 37, the number of defined small blocks 40, the form of the narrow groove 30 itself, and the like is not limited.

Further, while in the pneumatic tire 1 according to the embodiment described above the raised bottom portion 60 formed in the shoulder lug groove 18 is formed with a groove depth that decreases in two steps from the inner side toward the outer side in the tire lateral direction, the number of steps in which the groove depth changes by the raised bottom portion 60 may be other than two. As long as the raised bottom portion 60 is formed with the groove depth decreasing gradually in a plurality of steps from the inner side toward the outer side in the tire lateral direction, the number of steps of the change in groove depth is not limited.

Further, while in the embodiment described above, five circumferential main groove 10 are formed, the number of circumferential main grooves 10 may be other than five. Regardless of the number of circumferential main grooves 10, the blocks 20 positioned in the inner region 4 are defined into three or more small blocks 40, the blocks 20 positioned in the outer regions 5 are defined into a number of small blocks 40 that is at least one less than the number of the small blocks 40 defined in the blocks 20 positioned in the inner region 4, and the leading-side block 41 is made smaller than the trailing-side block 42, making it possible to improve uneven wear resistance and reduce noise in a balanced manner.

EXAMPLES

FIGS. 18A to 18C are tables listing the results of performance tests of pneumatic tires. In relation to the pneumatic tire 1 described above, performance evaluation tests conducted on a pneumatic tire of a Conventional Example, the pneumatic tire 1 according to the present technology, and pneumatic tires of Comparative Examples that are to be compared to the pneumatic tire 1 according to the present technology are described below. The performance evaluation tests were conducted on uneven wear performance, which refers to the performance of uneven wear of the tread surface 3, and pass-by noise performance, which refers to the performance of noise produced in association with the rolling of the pneumatic tire 1.

The performance evaluation tests were conducted by mounting the pneumatic tire 1 having a size of 315/70R22.5 defined by ETRTO on a regular rim, adjusting the air pressure to 900 kPa, mounting the tire onto a 2-D test vehicle, and then running tests. Evaluation methods of each tests are described below. Uneven wear performance was evaluated by visually evaluating uneven wear, specifically heal and toe wear, of the tread surface 3 after conducting a 100,000 km road test using the test vehicle. Uneven wear performance is expressed by using the evaluation result of the Conventional Example described later as an index value of 100. A larger index value indicates a smaller degree of uneven wear and thus a greater degree of excellence in uneven wear performance. Further, pass-by noise performance was evaluated on the basis of the measured volume of exterior pass-by noise in accordance with a tire noise test method defined in ECE (Economic Commission for Europe) Regulation No. 117, Revision 2 (ECE R117-02). In this test, the test vehicle was driven from an area at a sufficient distance in front of a noise measurement section, the engine was stopped immediately in front of the section, and a maximum noise level dB (noise level within a frequency range of from 800 to 1200 Hz) in the noise measurement section during coasting was measured at a plurality of speeds obtained by substantially equally dividing a speed range into eight or more intervals of ±10 km/h with respect to a standard speed, and setting the average as the exterior pass-by noise. The maximum noise level dB is a sound pressure dB (A) measured through an A-characteristic frequency correction circuit using a stationary microphone installed 7.5 m laterally from a travel center line at an intermediate point in the noise measurement section and at a height of 1.2 m from the road surface. Pass-by noise performance is expressed based on the measurement result by using the Conventional Example described later as an index value of 100. A larger index value indicates a smaller sound pressure dB, that is, a smaller pass-by noise, and thus greater level of excellence in pass-by noise performance.

Performance evaluation tests were conducted on 17 pneumatic tires, namely a pneumatic tire of a Conventional Example, which is one example of the pneumatic tire 1 in the related art, Examples 1 to 14 which are the pneumatic tires 1 according to the present technology, and Comparative Examples 1 and 2 which are pneumatic tires that are to be compared to the pneumatic tire 1 according to the present technology. Of these pneumatic tires 1, in the pneumatic tire of the Conventional Example, the circumferential main groove 10 does not form a zigzag shape, the blocks 20 in the inner region 4 do not include three or more small blocks 40 with the number of small blocks 40 of the blocks 20 in the outer regions 5 being at least one less than the number of small blocks 40 of the blocks 20 in the inner region 4, and the surface area of the leading-side block 41 is not less than the surface area of the trailing-side block 42. Further, in the pneumatic tires 1 of the Comparative Examples 1 and 2, the circumferential main groove 10 forms a zigzag shape, and either the blocks 20 in the inner region 4 do not include three or more small blocks 40 with the number of small blocks 40 of the blocks 20 in the outer regions 5 being at least one less than the number of small blocks 40 of the blocks 20 in the inner region 4 or the surface area of the leading-side block 41 is not less than the surface area of the trailing-side block 42.

In contrast, in Examples 1 to 14, which are examples of the pneumatic tire 1 according to the present technology, the circumferential main grooves 10 all form a zigzag shape, the blocks 20 in the inner region 4 are defined into three or more small blocks 40 with the number of small blocks 40 of the blocks 20 in the outer regions 5 being at least one less than the number of small blocks 40 of the blocks 20 in the inner region 4, and the surface area of the leading-side block 41 is less than the surface area of the trailing-side block 42. Further, the pneumatic tires 1 of Examples 1 to 14 are each different in terms of whether or not the leading-side block 41 is positioned on the tire equator line CL side, whether or not the total surface area of the small blocks 40 adjacent to the intersection portions 50 increases from the inner side toward the outer side in the tire lateral direction, the ratio of the outer intersection portion surface area AO to the inner intersection portion surface area AI with the same circumferential main groove 10, whether or not the amount of shift in the tire circumferential direction between the blocks 20 adjacent to each other differs between the blocks 20 adjacent to each other with the center circumferential main groove 11 therebetween and the blocks 20 adjacent to each other with one of the circumferential main grooves 10 other than the center circumferential main groove 11 therebetween, the ratio of the groove width WS of the circumferential main groove 10 to the groove width WL of the lug groove 15, whether or not the raised bottom portion 60 is formed in the shoulder lug groove 18, and whether or not the blocks 20 positioned in the center region 6 are asymmetrical with the tire equator line CL as the axis of symmetry.

As shown in FIGS. 18A to 18C, the results of the evaluation tests conducted using these pneumatic tires 1 indicate that the pneumatic tires 1 of the Examples 1 to 14 can improve both uneven wear performance and pass-by noise performance in contrast to the Conventional Example and the Comparative Examples 1 and 2. That is, the pneumatic tires 1 according to Examples 1 to 14 can improve uneven wear resistance and reduce noise in a compatible manner.

The invention claimed is:

1. A pneumatic tire having a specified rotation direction, comprising:
   a plurality of circumferential main grooves formed on a tread surface and extending in a tire circumferential direction;
   a plurality of lug grooves formed on the tread surface and extending in a tire lateral direction;
   a plurality of blocks wherein both sides of each block are defined in the tire circumferential direction by the lug grooves and at least one end portion of each block being defined in the tire lateral direction by the circumferential main grooves; and
   a plurality of block rows formed by aligning a plurality of the blocks in the tire circumferential direction; wherein
   given, a region in the tread surface inward from shoulder circumferential main grooves that are the circumferential main grooves positioned outermost in the tire lateral direction among the plurality of circumferential main grooves, as an inner region, and another region in the tread surface outward from the shoulder circumferential main grooves in the tire lateral direction as outer regions,
   the inner region comprises a plurality of the block rows aligned in the tire lateral direction;
   the blocks each comprise at least one narrow groove that opens to at least one of a circumferential main groove or a lug groove, and defines each block into a plurality of small blocks,
   the blocks positioned in the inner region are defined into three or more of the small blocks by the narrow grooves, wherein the at least one narrow groove comprises a single lateral narrow groove extending across each block in the tire lateral direction and defining multiple of the small blocks in the tire circumferential direction, and the at least one narrow groove comprises at least one narrow groove opening to at least one lug groove;
   the blocks positioned in the outer regions are defined into a number of small blocks by the narrow grooves, the number being at least one less than the number of the small blocks defined in the block positioned in the inner region,
   the small block that, among the plurality of small blocks belonging to a block of the blocks, comprises a portion of the block positioned on a frontmost side in a tire rotation direction is a leading-side block,
   the small block that, among the plurality of small blocks belonging to a block of the blocks, comprises a portion of the block positioned on a backmost side in the tire rotation direction is a trailing-side block, and
   the leading-side block has a surface area less than that of the trailing-side block.

2. The pneumatic tire according to claim 1, wherein the blocks each have a length LB in the tire circumferential direction and a width WB in the tire lateral direction, the length LB and the width WB having a relationship within a range of 0.9≤(LB/WB)≤1.6.

3. The pneumatic tire according to claim 2, wherein the leading-side block is adjacent to the circumferential main groove that, among the circumferential main grooves that define the block comprising the leading-side block, is positioned on a tire equator line side of the block.

4. The pneumatic tire according to claim 3, wherein a plurality of the lug grooves are configured so that the lug grooves connected from both sides in the tire lateral direction to the circumferential main grooves differ in position in the tire circumferential direction, and
given, among intersection portions between the circumferential main grooves and the lug grooves, the intersection portion where a lug groove is connected to a circumferential main groove from an outer side in the tire lateral direction as an outer intersection portion, and among intersection portions, the intersection portion where a lug groove is connected to a circumferential main groove from an inner side in the tire lateral direction as an inner intersection portion, a total surface area of the plurality of small blocks adjacent to one of the outer intersection portions as an outer intersection portion surface area, and a total surface area of the plurality of small blocks adjacent to one of the inner intersection portions as an inner intersection portion surface area,
a plurality of the outer intersection portion surface areas corresponding to areas of the outer intersection portions positioned in one region in the tire lateral direction from the tire equator line increase as a position of the outer intersection portion in the tire lateral direction increases in distance from the tire equator line to an outer side in the tire lateral direction, and a plurality of the inner intersection portion surface areas corresponding to a areas of the inner intersection portions positioned in one region in the tire lateral direction from the tire equator line increase as a position of the inner intersection portion in the tire lateral direction increases in distance from the tire equator line to an outer side in the tire lateral direction.

5. The pneumatic tire according to claim 4, wherein the intersection portions between the lug grooves and the circumferential main groove positioned on the tire equator line are configured so that the intersection portions where the lug grooves are connected to the circumferential main groove positioned on the tire equator line from one region side with the tire equator line as a boundary are the inner intersection portions positioned in another region side with the tire equator line as the boundary.

6. The pneumatic tire according to claim 5, wherein the blocks adjacent to each other with the circumferential main groove therebetween are configured so that the blocks adjacent to each other with a center circumferential main groove therebetween, the center circumferential main groove being the circumferential main groove among the plurality of circumferential main grooves that is positioned on the tire equator line, and the blocks adjacent to each other with one of the circumferential main grooves other than the center circumferential main groove therebetween differ in an amount of shift in the tire circumferential direction.

7. The pneumatic tire according to claim 6, wherein the blocks adjacent to each other with the center circumferential main groove therebetween have an amount of shift in the tire circumferential direction within a range of from 0.05 to 0.2 times, inclusive, the length LB of a block in the tire circumferential direction of the blocks adjacent to each other with the center circumferential main groove therebetween, and the blocks adjacent to each other with one of the circumferential main grooves other than the center circumferential main groove therebetween have an amount of shift in the tire circumferential direction within a range of from 0.4 to 0.6 times, inclusive, the length LB of a block in the tire circumferential direction of the blocks adjacent to each other with one of the circumferential main grooves other than the center circumferential main groove therebetween.

8. The pneumatic tire according to claim 7, wherein the circumferential main grooves and the lug grooves that define a block of the blocks are configured so that a relationship between a groove width WS of the each circumferential main groove and a groove width WL of each lug groove is within a range of $0.5 \leq (WS/WL) \leq 1.0$.

9. The pneumatic tire according to claim 8, wherein a lug groove defined as a shoulder lug groove connected from an outer side in the tire lateral direction to a shoulder circumferential main groove comprises a raised bottom portion having a groove depth that gradually decreases from an inner side toward an outer side in the tire lateral direction.

10. The pneumatic tire according to claim 9, wherein the blocks have an asymmetrical shape with the tire equator line as an axis of symmetry in only portions positioned within a range of 15% of a developed tread width from the tire equator line to each side in the tire lateral direction.

11. The pneumatic tire according to claim 1, wherein the leading-side block is adjacent to the circumferential main groove that, among the circumferential main grooves that define the block comprising the leading-side block, is positioned on a tire equator line side of the block.

12. The pneumatic tire according to claim 1, wherein a plurality of the lug grooves are configured so that the lug grooves connected from both sides in the tire lateral direction to the circumferential main grooves differ in position in the tire circumferential direction, and given, among intersection portions between the circumferential main grooves and the lug grooves, the intersection portion where a lug groove is connected to a circumferential main groove from an outer side in the tire lateral direction as an outer intersection portion, and among intersection portions, the intersection portion where a lug groove is connected to a circumferential main groove from an inner side in the tire lateral direction as an inner intersection portion, a total surface area of the plurality of small blocks adjacent to one of the outer intersection portions as an outer intersection portion surface area, and a total surface area of the plurality of small blocks adjacent to one of the inner intersection portions as an inner intersection portion surface area, a plurality of the outer intersection portion surface areas corresponding to areas of the outer intersection portions positioned in one region in the tire lateral direction from a tire equator line increase as a position of the outer intersection portion in the tire lateral direction increases in distance from the tire equator line to an outer side in the tire lateral direction, and a plurality of the inner intersection portion surface areas corresponding to areas of the inner intersection portions positioned in one region in the tire lateral direction from the tire equator line increase as a position of the inner intersection portion in the tire lateral direction increases in distance from the tire equator line to an outer side in the tire lateral direction.

13. The pneumatic tire according to claim 12, wherein the intersection portions between the lug grooves and the circumferential main groove positioned on the tire equator line are configured so that the intersection portions where the lug grooves are connected to the circumferential main groove positioned on the tire equator line from one region side with the tire equator line as a boundary are the inner intersection portions positioned in another region side with the tire equator line as the boundary.

14. The pneumatic tire according to claim 1, wherein the blocks adjacent to each other with the circumferential main groove therebetween are configured so that the blocks adjacent to each other with a center circumferential main groove therebetween, the center circumferential main groove being the circumferential main groove among the plurality of circumferential main grooves that is positioned on a tire equator line, and the blocks adjacent to each other with one of the circumferential main grooves other than the center circumferential main groove therebetween differ in an amount of shift in the tire circumferential direction.

15. The pneumatic tire according to claim 14, wherein the blocks adjacent to each other with the center circumferential main groove therebetween have an amount of shift in the tire circumferential direction within a range of from 0.05 to 0.2 times, inclusive, a length LB of a block in the tire circumferential direction of the blocks adjacent to each other with the center circumferential main groove therebetween, and the blocks adjacent to each other with one of the circumferential main grooves other than the center circumferential main groove therebetween have an amount of shift in the tire circumferential direction within a range of from 0.4 to 0.6 times, inclusive, the length LB of the block in the tire circumferential direction of the blocks adjacent to each other with one of the circumferential main grooves other than the center circumferential main groove therebetween.

16. The pneumatic tire according to claim 1, wherein the circumferential main grooves and the lug grooves that define a block of the blocks are configured so that a relationship between a groove width WS of each circumferential main groove and a groove width WL of each lug groove is within a range of $0.5 \leq (WS/WL) \leq 1.0$.

17. The pneumatic tire according to claim 1, wherein a lug groove defined as a shoulder lug groove connected from an outer side in the tire lateral direction to a shoulder circumferential main groove comprises a raised bottom portion having a groove depth that gradually decreases from an inner side toward an outer side in the tire lateral direction.

18. The pneumatic tire according to claim 1, wherein the blocks have an asymmetrical shape with a tire equator line as an axis of symmetry in only portions positioned within a range of 15% of a developed tread width from the tire equator line to each side in the tire lateral direction.

19. The pneumatic tire according to claim 1, wherein the at least one narrow groove comprises a groove width of from 1.1 to 2 mm.

20. The pneumatic tire according to claim 1, wherein each block in the inner region includes a same number of the small blocks.

\* \* \* \* \*